Aug. 4, 1953
ALEXANDER LISSIANSKY
NOW BY CHANGE OF NAME
ALEXANDER LISSANCE
SOUND RECORDING AND REPRODUCING APPARATUS
2,647,751
Filed July 5, 1947
11 Sheets-Sheet 2
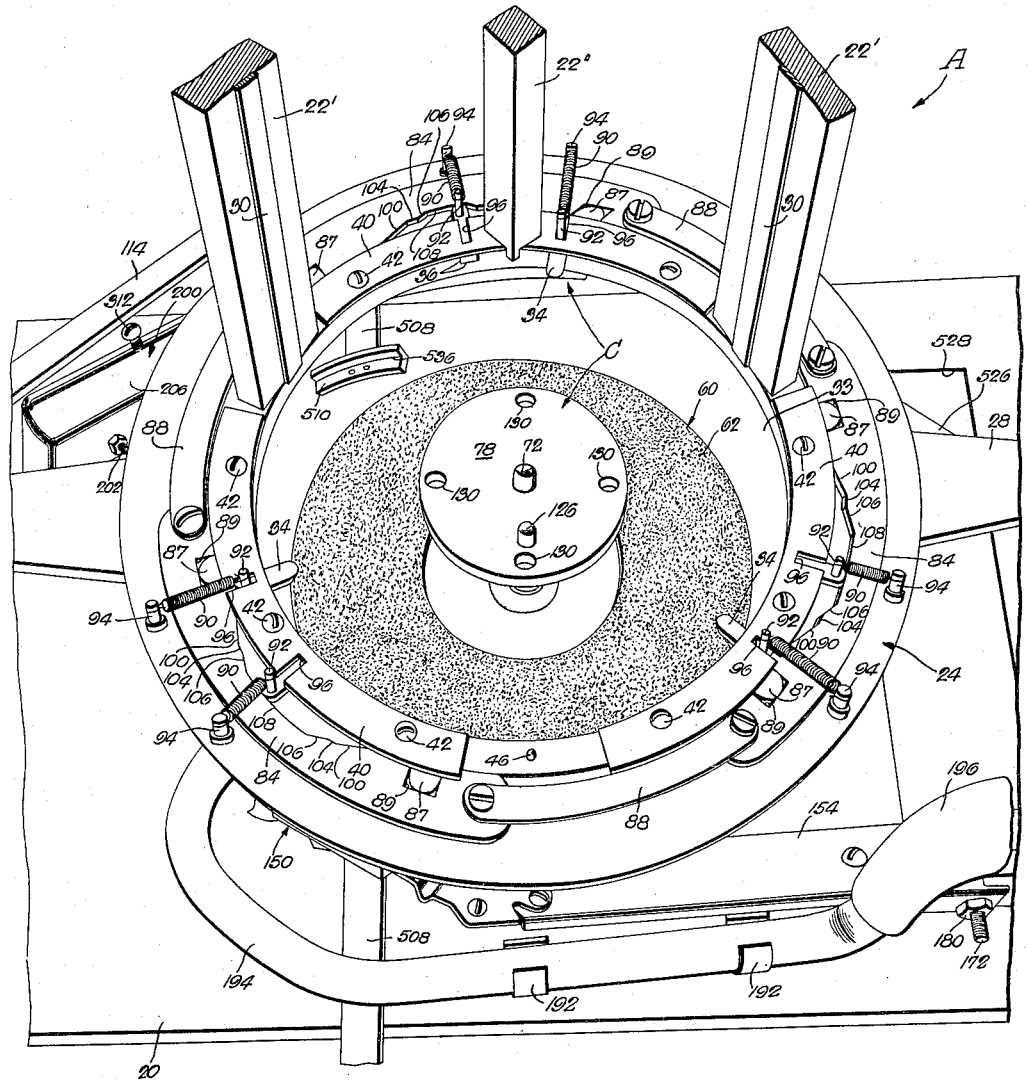
INVENTOR
ALEXANDER LISSIANSKY
BY Edwin Levisohn
ATTORNEY

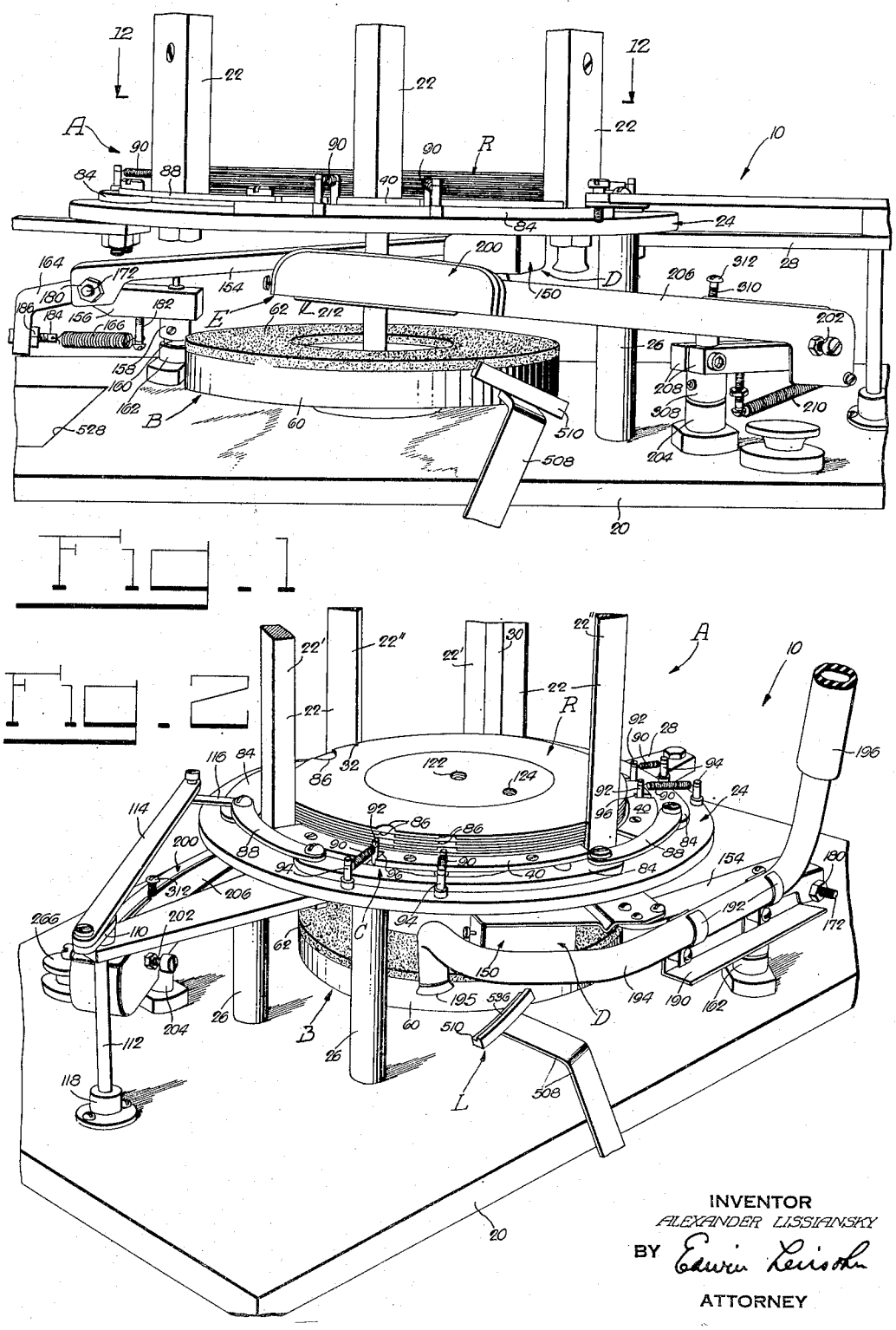

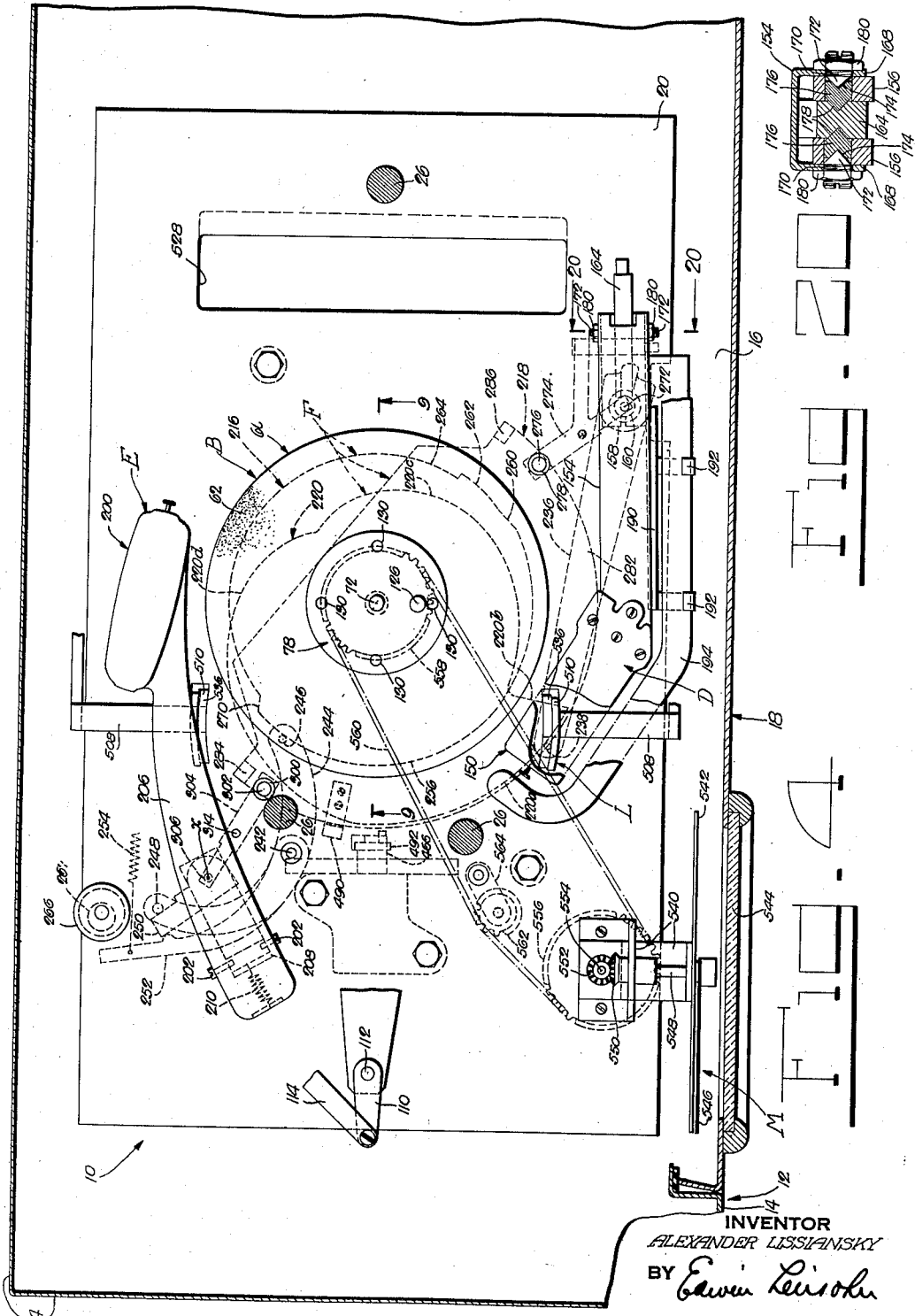

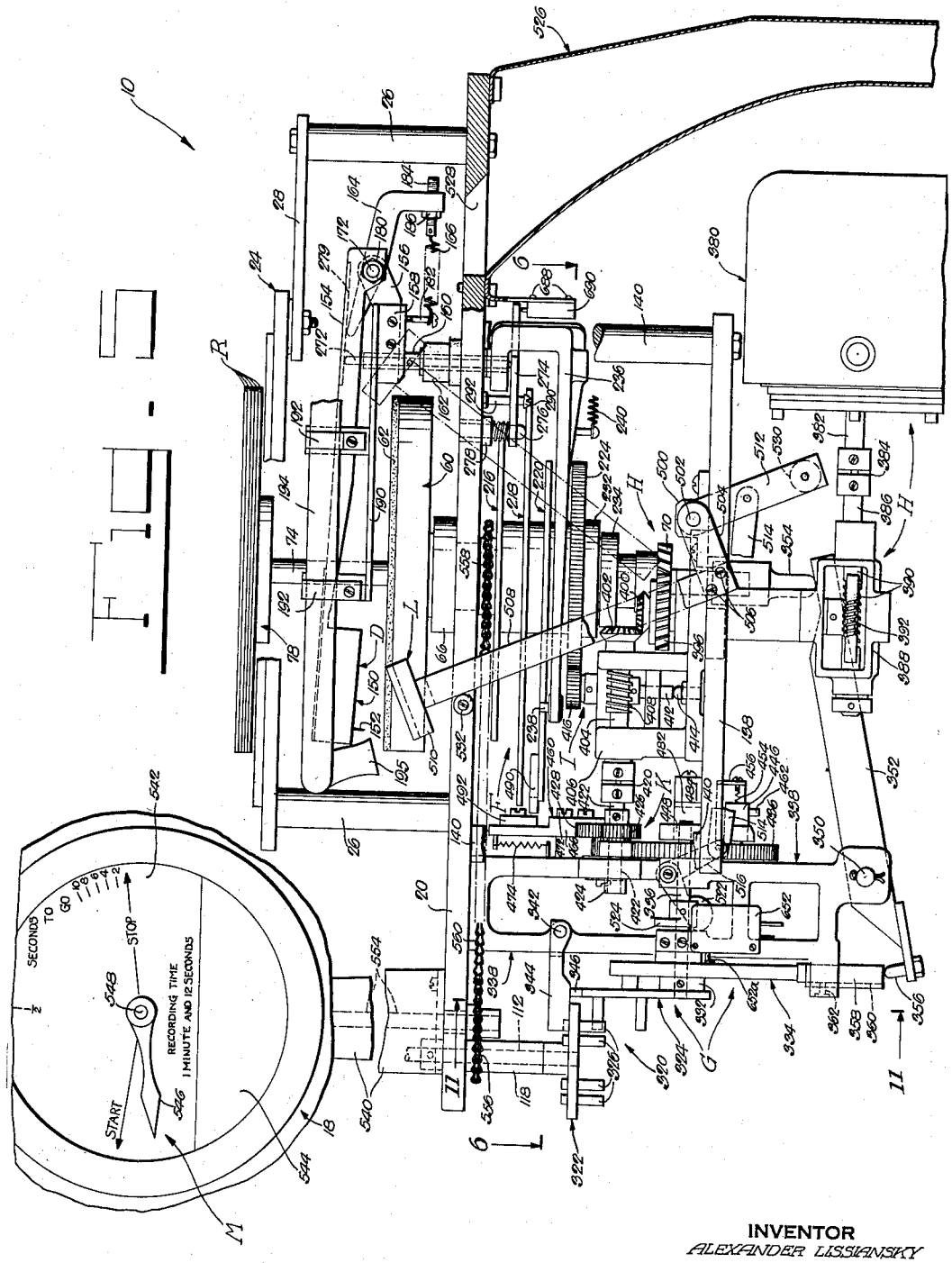

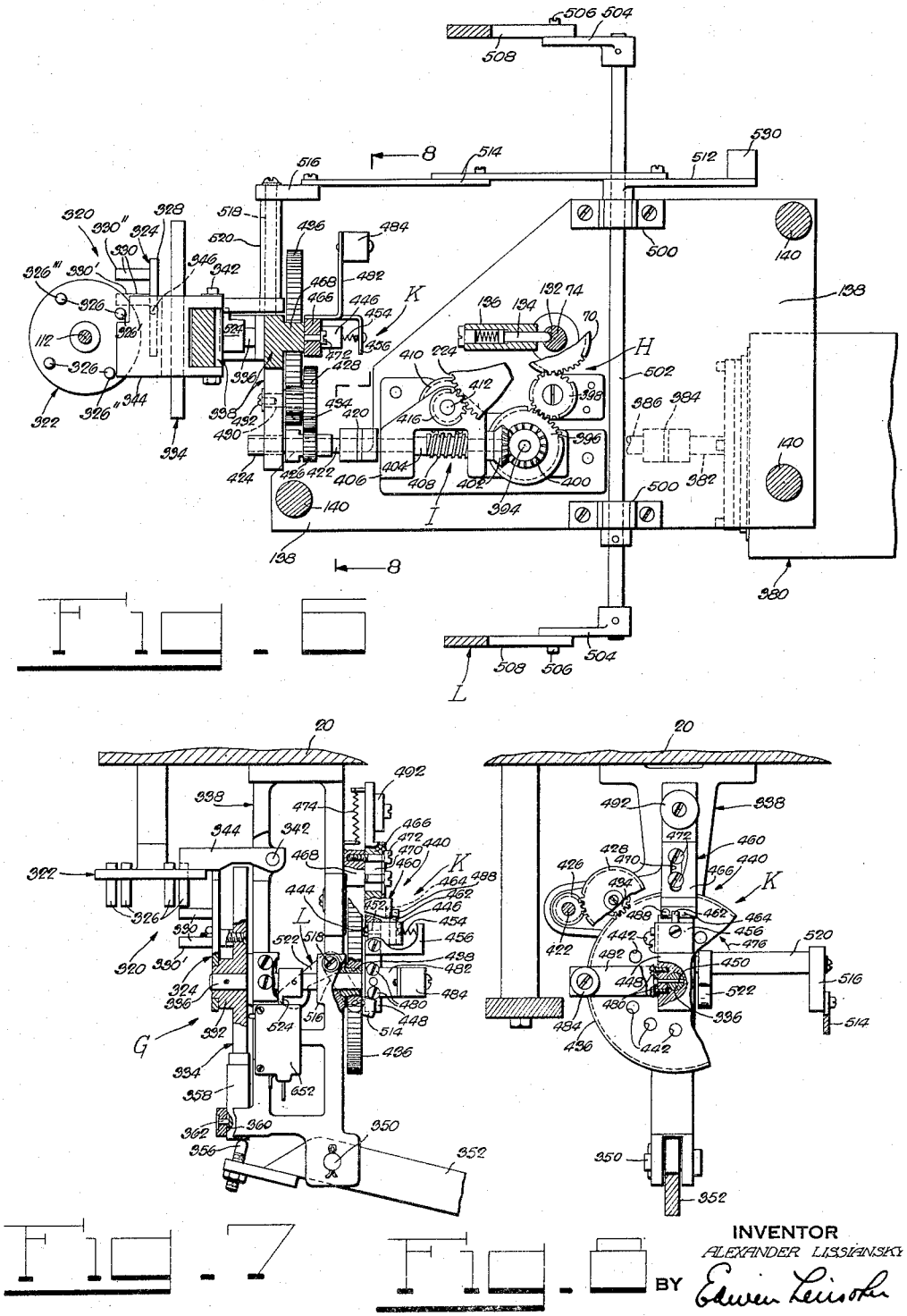

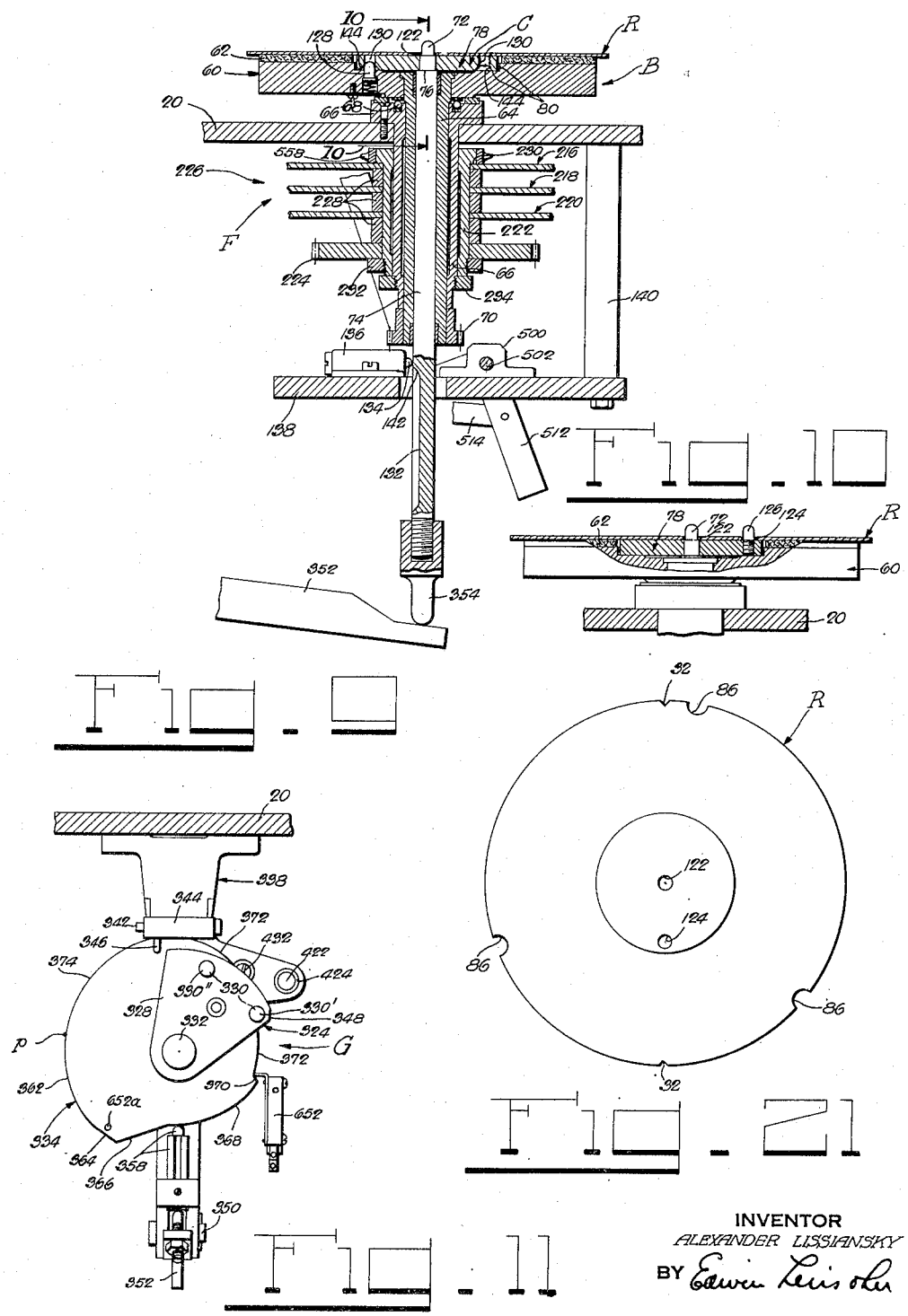

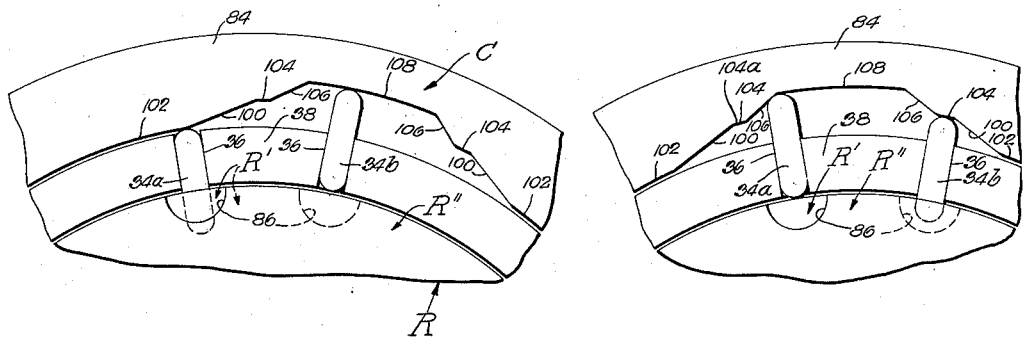
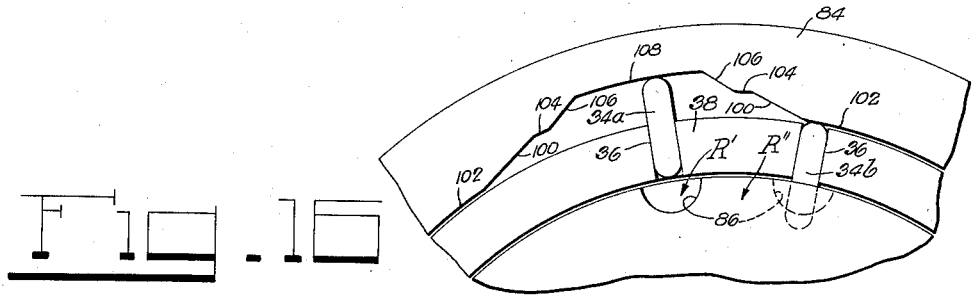
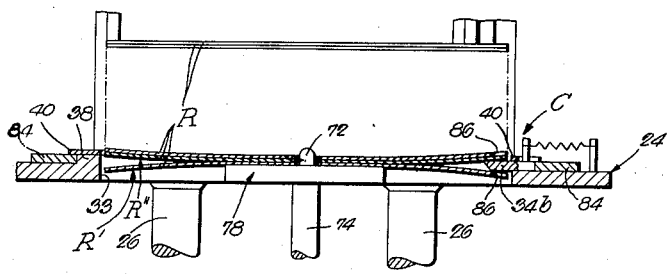
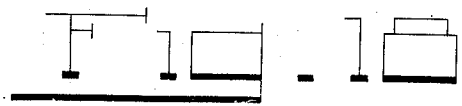

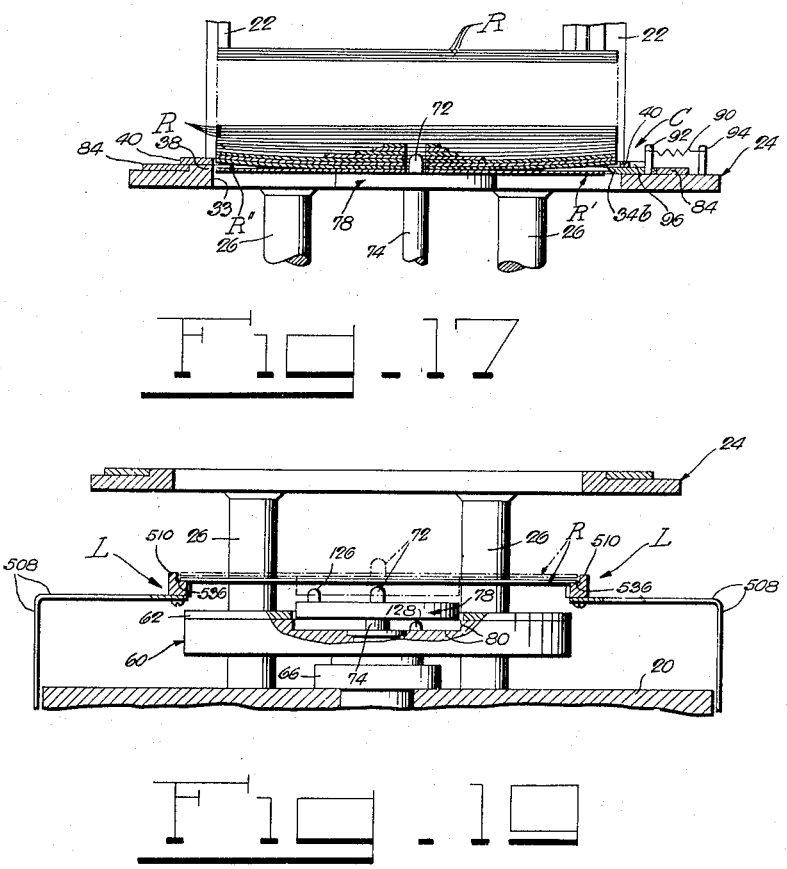

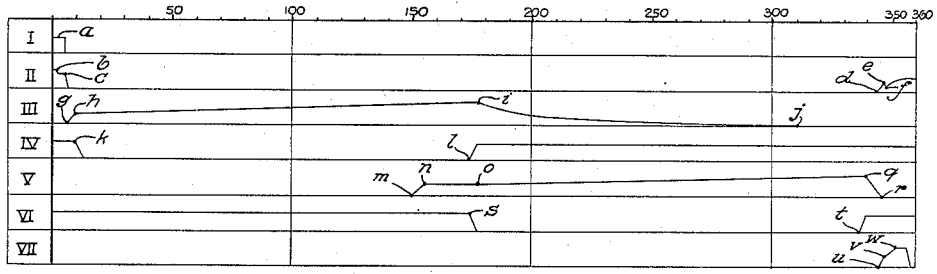
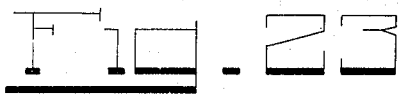
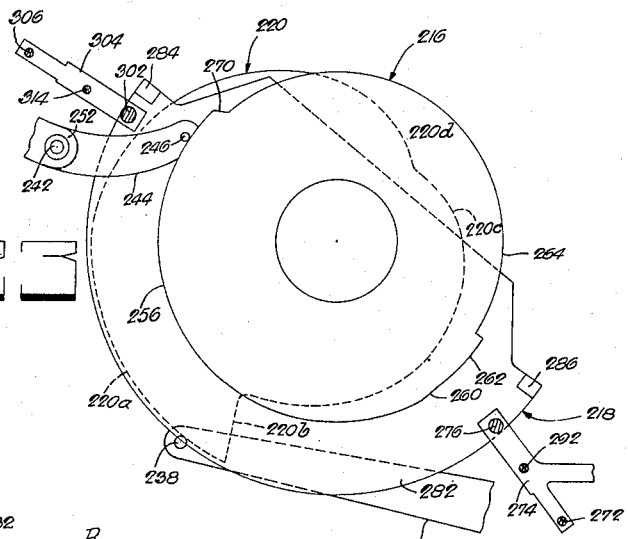
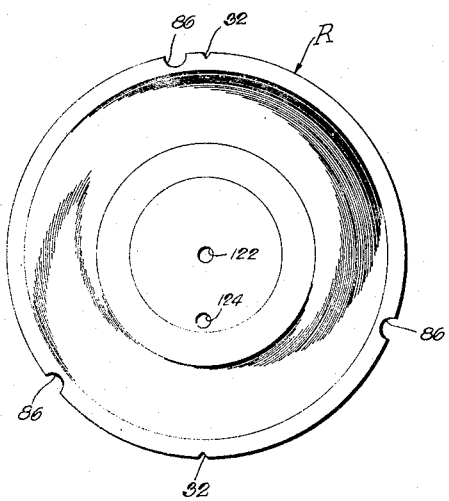
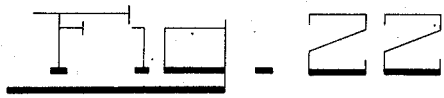

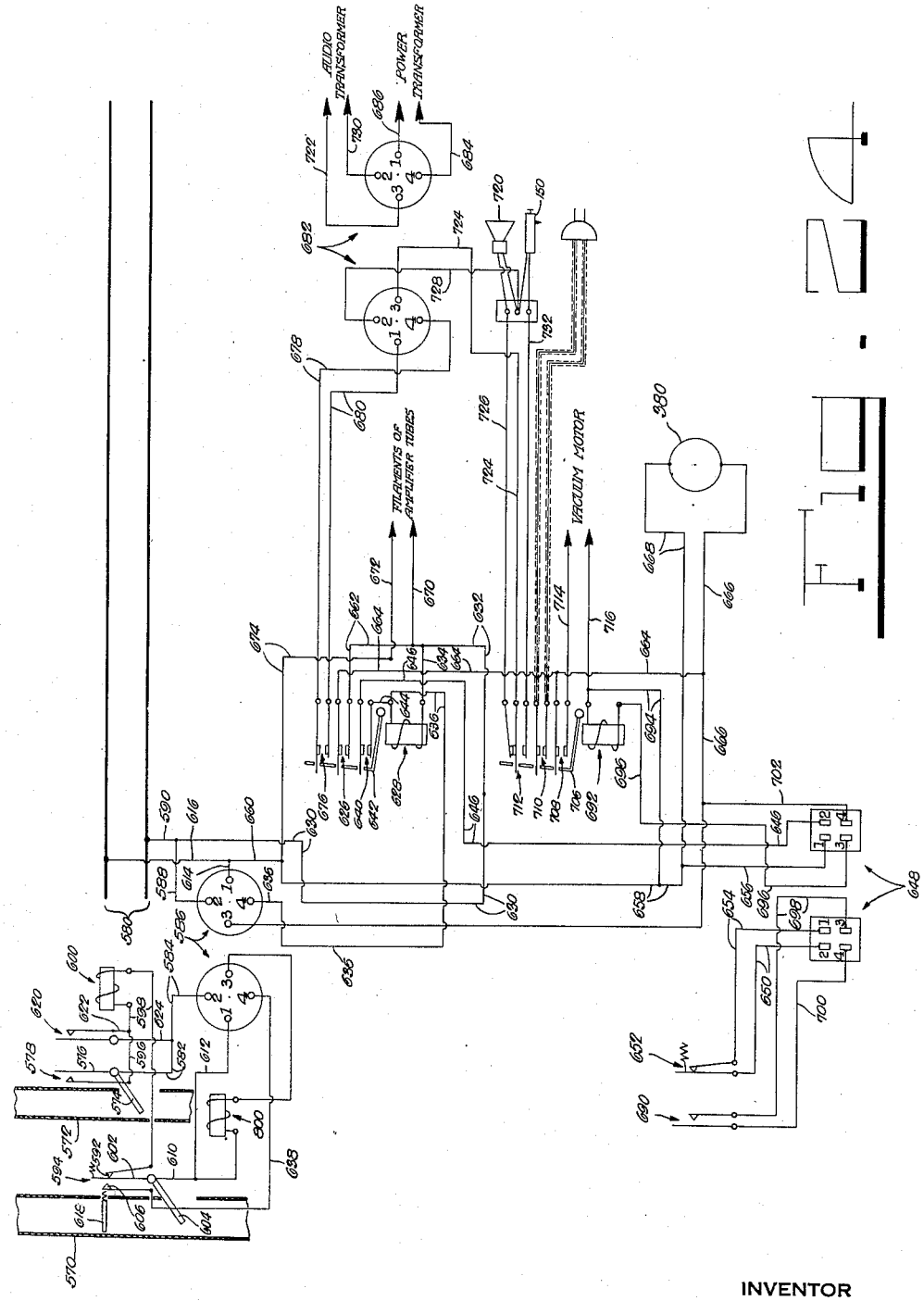

Patented Aug. 4, 1953

2,647,751

UNITED STATES PATENT OFFICE 2,647,751

SOUND RECORDING AND REPRODUCING APPARATUS

Alexander Lissiansky, now by change of name Alexander Lissance, New York, N. Y., assignor to International Mutoscope Corporation, Long Island, N. Y., a corporation Application July 5, 1947, Serial No. 759,152

7 Claims. (Cl. 274—10)

1

This invention relates to apparatus for recording sound on, and vending, phonographic records.

Prior apparatus of this type are known, including that shown and described in my prior Patent No. 2,342,241, dated February 22, 1944. These prior apparatus have facilities for transferring a phonographic record from a supply stack in a magazine onto a turntable, and the record turns with the latter through frictional engagement with the same. In transferring a record from a magazine to the turntable, it happens now and then that two or more records stick together and are delivered onto the turntable, resulting in an inferior, if not spoiled recording and possibly in a jam somewhere in the apparatus. Hence, these prior apparatus are not as reliable in operation as is desirable, particularly if they are intended for installation in public places to be used by the general public. Further, the record-transfer provision of these prior apparatus are comparatively slow in their performance and the recording is unavoidably delayed, resulting in comparatively lengthly operating cycles of these prior apparatus and accordingly small productive capacity of the same. These prior apparatus are also quite complicated and bulky in construction and do not readily lend themselves to efficient mass production at reasonably low cost.

It is the primary aim and object of the present invention to provide apparatus of this type which has none of the above disadvantages of the prior apparatus, affords more recording time than the latter during an operating cycle of the same duration, and gives better recordings on inexpensive records than was heretofore possible.

Accordingly, it is a further important object of the present invention to coordinate the record supply magazine with the turntable so that a record travels through a minimum distance during its transfer, thereby contributing toward the attainment of a short operating cycle of the apparatus and accordingly high productive capacity of the same.

It is another important object of the present invention to make the records integral parts of the apparatus from the moment they are placed in the magazine until they are about to be ejected from the apparatus as finished recordings, by interlocking the records with parts of the apparatus throughout their presence in, and passage through, the latter, thereby permitting their rapid and unfailing transfer onto the turntable and their subjection to a recording cutter immediately on their placement on the turntable.

It is another important object of the present invention to provide for positive and unfailing separation between the record to be transferred from the magazine and the remaining records therein.

It is another important object of the present invention to construct the recording mechanism of the present apparatus so that the same will cut most uniform sound grooves on records, even if their recording surfaces are imperfect to the extent that they would ordinarily not give satisfactory recordings, thus not only generally improving the quality of the recordings, but making gainful and satisfactory use of many imperfect records that could not be used heretofore.

It is another important object of the present invention to make the apparatus of simple and durable construction, and to use in its construction a minimum number of parts that are readily assembled and, after assembly, conveniently accessible for repair or replacement.

The above and other objects, features and advantages of the present invention will be more fully understood from the following description considered in connection with the accompanying illustrative drawings.

In the drawings:

Fig. 1 is a fragmentary side perspective view of apparatus embodying the present invention;

Figs. 2 and 3 are other fragmentary perspective views of the apparatus;

Fig. 4 is a top plan view, partly broken away, of the apparatus as installed in a cabinet;

Fig. 5 is a front elevation of the apparatus as viewed from a direction opposite to that in which the same is viewed in Fig. 1;

Fig. 6 is a horizontal section through the apparatus taken substantially on the line 6—6 of Fig. 5;

Fig. 7 is an elevational view, partly in section, of a part of the apparatus shown in Fig. 5, with certain elements in different operating positions, however;

Fig. 8 is a fragmentary section taken substantially on the line 8—8 of Fig. 6;

Fig. 9 is a fragmentary section taken on the line 9—9 of Fig. 4;

Fig. 10 is a fragmentary section, partly in elevation, of the turntable, the section being taken on the line 10—10 of Fig. 9;

Fig. 11 is a fragmentary section taken substantially on the line 11—11 of Fig. 5;

Figs. 14, 15 and 16 are enlarged fragmentary views of certain cooperating elements of the record-release provisions on the magazine, showing progressive steps in the release of a record from the magazine;

Fig. 17 is a section similar to Fig. 13, showing the lowermost record in the magazine released therefrom;

Fig. 18 is a section similar to Fig. 17, illustrating the positive separation of the released record from the remaining records in the magazine;

Fig. 19 is a fragmentary transverse section through the apparatus, showing a prominent step in the ejection of a finished record from the apparatus;

Fig. 20 is an enlarged section taken on the line 20—20 of Fig. 4;

Fig. 21 is a plan view of a record blank as supplied to the magazine;

Fig. 22 is a plan view of a finished record bearing a recording;

Fig. 23 is a diagrammatic illustration of certain main control and operating cams of the apparatus in their properly coordinated relation;

Fig. 24 is a wiring diagram of the electrical operating devices and controls of the apparatus; and Fig. 25 is a time chart illustrating graphically the timed relation of the operations of the main operating mechanisms of the apparatus.

Figures 12, 13:
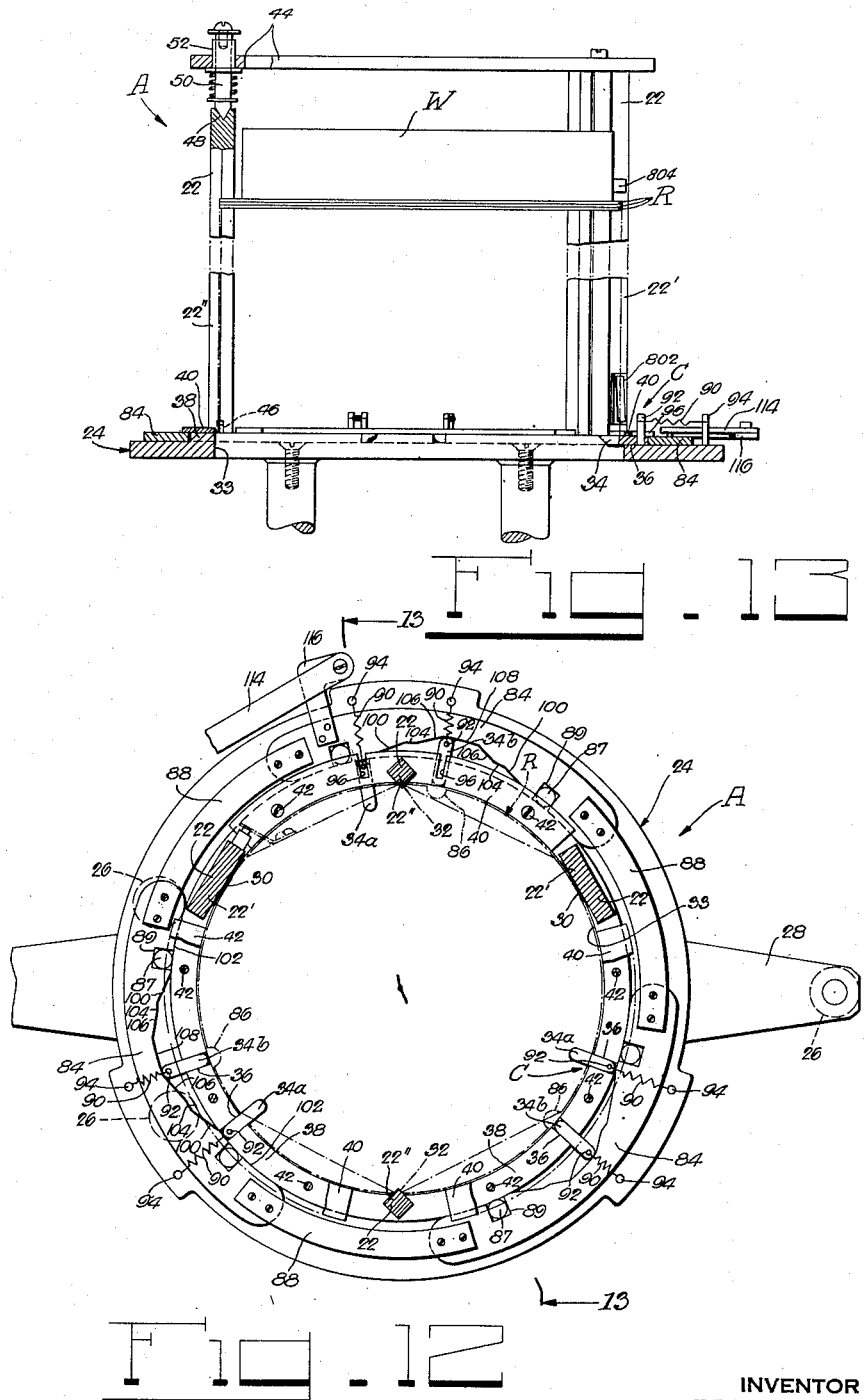
Fig. 12 is a top plan view, partly in section, of the record magazine of the apparatus, the section being taken on the line 12—12 of Fig. 1.
Fig. 13 is a section taken substantially on the line 13—13 of Fig. 12.

Referring to the drawings, the present apparatus 10 is housed in a cabinet 12 (Fig. 4) which may be of any suitable construction and design, and comprises upright walls 14, a bottom wall 16 and a preferably closed top (not shown). The cabinet 12 is preferably provided in its front wall with a normally closed, hinged door 18 for access to the apparatus 10. The various operating mechanisms and devices of the apparatus are mounted on a main plate or support 20 which is, in turn, mounted in any suitable manner (not shown) in the cabinet 12. The various operating mechanisms and devices of the present apparatus are as follows: Record Supply Magazine "A" (Figs. 1, 2, 3, 12 and 13); Turntable "B" (Figs. 1, 2, 4 and 9); Record Release and Transfer Mechanism "C" (Figs. 2, 3, 9 and 12 to 18); Recording Head "D" (Figs. 1, 2, 4 and 5); Reproducing Head "E" (Figs. 1 and 4); Operating Controls "F" for Heads "D" and "E" (Figs. 4, 5 and 9); Operating Controls "G" for Mechanism "C" (Figs. 5, 7 and 11); Turntable Drive "H" (Figs. 5 and 6); Drive "I" for Controls "F" (Figs. 5 and 6); Drive "K" for Controls "G" (Figs. 5, 6, 7 and 8); Record Ejecting Device "L" (Figs. 2, 4, 5, 6, 7 and 19) and Recording Time Indicator "M" (Figs. 4 and 5). These mechanisms and devices are hereinafter described under the above headings.

Record supply magazine "A"

Referring to Figs. 2, 12 and 13, the record supply magazine A comprises several, in the present instance four, upright bars 22 on a ring support 24 which is mounted above the main support 20 on upright posts 26 one of which supports an extension 28 of the ring support 24 (see also Fig. 5). The bars 22 are paired into record guide bars 22' and record locking bars 22", and are so arranged as to confine a supply stack of superposed records R in the manner shown in Fig. 2 and also as indicated in dot-and-dash lines in Fig. 12. Of course, the records R are, prior to being recorded thereon, mere blanks (Fig. 21). The guide bars 22' are provided with wear strips 30 which engage or slightly clear the peripheries of the stacked records R, while the locking bars 22", which are preferably disposed diametrically opposite to each other, may be of square cross-section so as to be registerable with diametrically opposite peripheral notches 32 in the stacked records R (Figs. 2, 12 and 21). The central opening 33 in the ring support 24 is sufficiently large to permit the passage therethrough of records from the magazine. The records in the magazine are supported at a certain time in an operating cycle of the apparatus on fingers 34 which are radially movable into and from the central opening 33 in the ring support 24 in guideways 36 provided in a raised annular shoulder 38 of the ring support (Figs. 12 and 13). The fingers 34 are held in their respective guideways 36 by arcuate retainers 40 which are suitably secured to the ring support 24 as by screws 42, for instance. The guide bars 22' and the locking bar 22" nearest thereto are permanently mounted on the ring support 24 by suitable bolts, for instance.

Suitably secured to the upper ends of the bars 22 is a top ring 44 (Fig. 13) which lends stability to the latter, as will be readily understood. The remaining or "front" locking bar 22" is mounted on the ring support 24 and top ring 44 for quick removal therefrom so as to provide for facile placement of a stack of records into the magazine from the side thereof. To this end, the front locking bar 22' (Fig. 13) registers at the bottom with a dowel pin 46 in the ring support 24, and is provided in its top with a conical socket 48 to receive the correspondingly shaped end of a spring-urged plunger 50 which is slidable in a bushing 52 in the top ring 44. Hence, the front locking bar 22" need merely be raised against the spring-urged plunger 50 until its bottom end clears the dowel 46, whereupon the bar may be removed from the magazine. Remounting the front locking bar 22" in the magazine is equally simple. In placing the records into the magazine it is, of course, imperative that the peripheral notches 32 in the records are aligned with each other and brought into registry with the locking bars 22", as otherwise the removable locking bar could not be remounted in the magazine.

Turntable "B"

The turntable 60 (Figs. 1, 2, 3 and 5) carries a ring-shaped pad 62 of any suitable material sufficiently soft to cushion a record on the turntable. The turntable 60 is keyed or otherwise secured to a hollow shaft 64 (Fig. 9) which is journaled in a bearing sleeve 66 in the main support 20, the downward thrust of the turntable being taken up by bearing 68. Suitably mounted on the lower end of the hollow shaft 64 is a gear 70 which forms part of the drive of the turntable described hereinafter. The center pin 72 of the turntable is formed by the top end of a spindle 74 which is axially movable in the hollow shaft 64 and carries on its shoulder 76 a disc 78 which is seated in an annular recess 80 in the turntable when a record is on the latter. The disc 78 serves as a record transfer table and also as the primary support for the records in the magazine. The table 78 is movable with the spindle 74 for the transfer of a record from the magazine onto the turntable and also for the ejection of a finished record from the apparatus, all as hereinafter described.

Record release and transfer mechanism "C"

The transfer of a record from the magazine onto the turntable is accomplished in two steps, namely by releasing the lowermost record in the magazine and by lowering the released record onto the turntable. The release of the lowermost record in the magazine is accomplished by operation of the fingers 34 (Figs. 3 and 12), while the lowering of a released record onto the turntable is accomplished by the transfer table 78 on the spindle 74 (Figs. 3, 5 and 9).

In order that the fingers 34 may perform, besides their record-supporting function, the additional function of releasing the lowermost record in the magazine, they are arranged in angularly spaced pairs of which the fingers 34a and 34b of each pair are under the control of a preferably separate arcuate cam 84 which is so designed and operated as alternately to move the fingers 34a and 34b into and from the central opening 33 in the ring support 34 of the magazine. Further, proper record release performance of the fingers 34 requires additional peripheral notches 86 in the records (Fig. 21). In the present instance, there are provided three equi-angularly spaced pairs of identically constructed and coordinated fingers 34a and 34b, and the records R are accordingly provided with three equi-angularly spaced peripheral notches 86. The separate operating cams 84 for the respective finger pairs are also identical, and are joined by arcuate straps 88 (Fig. 12) so that the cams 84 form parts of an articulated ring which is journaled on the raised annular shoulder 38 of the ring support 24 through intermediation of anti-friction discs 87 in sockets 89 provided in the cams 84 (Figs. 3 and 12). The outer margins of the arcuate retainers 40 overlap the cams 84 (Figs. 12 and 13) and thus prevent removal of the latter from the ring support 24. The fingers 34a and 34b of each pair are urged into permanent engagement with their respective cam 84 by springs 90 which are anchored with one end on studs 92 on these fingers, and with their other ends on studs 94 on the ring support 24 (see also Fig. 3). The arcuate finger retainers 40 are radially slotted at 96 to admit the studs 92 on the fingers 34 when the latter advance into the central opening 33 in the ring support 24 of the magazine.

In order that the fingers 34 may perform their designated record-releasing function, it is further required that identical records R are stacked in the magazine in alternately inverted relation to each other, so that identical notches 86 in the stacked records are grouped in the alternating fashion clearly shown in Fig. 2. Hence, each peripheral notch 86 in a stacked record is covered on both sides by non-notched peripheral portions of the adjacent records.

Records are always so placed in the magazine that non-notched peripheral portions of the lowermost record R' are directly above the presently advanced fingers 34 as shown in Figs. 12 and 14. Since the action of the separate cams 84 on their respective finger pairs 34a, 34b is the same for the release of the lowermost record R' in the magazine, the action of only one of these cams will now be described with particular reference to Figs. 14 to 16. In Fig. 14, the advanced finger 34a extends beneath a non-notched peripheral portion of the lowermost record R', while the other finger 34b is completely retracted. To release the lowermost record R', cam 84 is turned counerclockwise from the position shown in Fig. 14 into the position shown in Fig. 15, whereby the finger 34a is completely retracted and clears the periphery of the record R', while the other finger 34b is advanced sufficiently to extend beneath a non-notched peripheral portion of the second-lowest record R'' in the magazine, but will clear the lowermost record R' due to its partial extension into the adjacent notch 86 therein. Hence, the lowermost record R' is now released from the magazine, at which time the same and the rest of the records in the magazine are centrally supported on the transfer table 78 in its uppermost position (see also Fig. 5). Shortly after the lowermost record R' has been released from the magazine, the transfer table 78 is slightly lowered from its uppermost position into the position shown in Fig. 17, thereby permitting the lower records in the magazine, which are now peripherally supported on the partially advanced fingers 34b (Figs. 15 and 17), to bulge downwardly in the center under the weight of the overlying records and an added weight W on the topmost record (Fig. 13). The records may be made of conventionally used material, such as pressed cardboard, which may be made to bulge as shown in Fig. 17 without becoming damaged or permanently deformed. The downward bulge deliberately imparted to the lowermost retained records in the magazine causes a clear separation between the latter records and the released record on the transfer table 78, and thus precludes sticking of the released record to the nearest record in the magazine when the transfer table 78 is subsequently lowered for the transfer of the released record onto the turntable. To render the separation between a released record and the remaining records in the magazine even more positive, the released record R' is so deformed that the same will, on its reformation during the subsequent descent of the transfer table 78 from the position shown in Fig. 17, spring away from the nearest record in the magazine. This is accomplished on continued rotation at that time of the cam 84 from the position shown in Fig. 15 to that shown in Fig. 16, during which the finger 34b is advanced to its innermost position (see also Fig. 18) in which it becomes so wedged between the released record R' and the nearest overlying record in the magazine as temporarily to deform the released record. Evidently, the deformed record R' will, on the subsequent descent of the transfer table 78 from the position shown in Fig. 18, be permitted to recover its original shape and thereby spring away from the records in the magazine.

In order that the fingers 34 may perform the above-described dual function of releasing the lowermost record from the magazine and positively separating the same from the remaining records therein, the identical cams 84 are designed as shown in Figs. 14 to 16. More particularly, each cam 84 has opposite inclined edges 100 which lead inwardly from the inner concentric edge 102 thereof to short dwells 104, respectively, and opposite inclined edges 106 which lead from the dwells 104, respectively, to a long dwell 108. The cam is so coordinated with its associated fingers 34a and 34b that either finger is in its most advanced position when in engagement with the inner concentric edge 102 of the cam, is completely retracted and clears the outer periphery of the adjacent record when in engagement with the innermost dwell 108 of the cam, and is in the partially advanced position shown at 34b in Fig. 15 when in engagement with either one of the intermediate dwells 104 in the cam.

While the cams 84 are turned counterclockwise as viewed in Figs. 14 to 16 for the above-described release of the lowermost record R' from the magazine and its separation from the remaining records therein, it will now be evident that the cams 84 are turned in the opposite direction for the subsequent release of the then lowermost record R'' from the magazine and its separation from the remaining records therein. Hence, the cams 84 have to be oscillated back and forth about the central axis of the magazine for the release of the successive records in the magazine. The cams 84 are thus oscillated by a crank 110 (Figs. 2 and 4) which is mounted on a rotary shaft 112 and drivingly connected by a link 114 and an arm 116 with one of the cams 84 (see also Fig. 12). Shaft 112 is journaled in a sleeve bearing 118 which projects from, and is preferably bolted to, the ring support 24 of the magazine (Fig. 2). Shaft 112 is driven in a manner hereinafter described.

It is contemplated to make the records integral parts of the apparatus during their presence in, and travel through, the latter, by interlocking them with parts of the apparatus from the moment they are placed in the magazine until they are about to be ejected from the apparatus as finished recordings. As already described, the records in the magazine are interlocked with the locking bars 22'' thereof.

Each record has, besides a center hole 122 for the reception of the center pin 72 on the transfer table 78, also a dowel hole 124. As shown in Fig. 21, the dowel hole 124 in each record is in line with the diametrically opposite notches 32 therein, wherefore the dowel holes 124 in the stacked records in the magazine are all axially aligned despite the alternately inverted disposition of successive records therein. These dowel holes 124 in the records are adapted to receive a dowel pin 126 on the transfer table 78 (Figs. 3, 4 and 10) and thus become locked to the latter prior to and during their release from the magazine, as well as during their transfer onto, and stay on, the turntable. The dowel pin 126 on the transfer table 78 serves also to interlock a transferred record with the turntable through intermediation of a spring-urged driving pin 128 in the latter which is adapted to register with one of several, in the present instance four, concentrically arranged holes or sockets 130 in the transfer table 78, and thus complete a positive driving connection between the turntable and a record thereon. In order that the dowel pin 126 on the transfer table 78 may, on ascent of the latter, register unfailingly with the dowel hole 124 in the lowermost record in the magazine, there is provided in the spindle 74 a longitudinal groove 132 into which projects a spring-urged plunger 134 (Figs. 6 and 9) when the transfer table 78 is out of driving relation with the driving pin 128 on the turntable 60. The plunger 134 then locks the spindle 74 and, hence, the transfer table 78 in an angular position in which the dowel pin 126 on the latter is in axial alignment with the dowel holes 124 in the stacked records in the magazine. The spring-urged plunger 134 is mounted in a bracket 136 on a mounting plate 138 which is held suspended from the main support 20 by bars 140 (Figs. 5, 6 and 9).

The coordination between the groove 132 in the spindle 74 and the spring-urged plunger 134 on the one hand, and the sockets 130 in the transfer table 78 and the driving pin 128 on the turntable 60 on the other hand, is such that the described locking actions of the plunger 134 and the pin 128, while taking place alternately, nevertheless nearly overlap each other at the periods of alternation so as to assure an uninterrupted interlock of the transfer table 78 either with the stationary frame of the apparatus by way of the plunger 134, or with the turntable 60 which, as hereinafter further described, rotates when the transfer table 78 places a record thereon. To this end, the spring-urged plunger 134 is, during descent of the transfer table, about ready to ride out of the groove 132 at the curved end 142 thereof (Fig. 9), when the driving pin 128 on the spinning turntable 60 is about to enter one of the sockets 130 in the transfer table 78, and the plunger 134 will be cammed out of the groove 132 when the driving pin 128 has found, and actually entered into driving engagement with, one of the sockets 130 in the transfer table 78. The sockets 130 in the transfer table 78 are chamfered as at 144 (Fig. 9), thereby cushioning the impact between them and the driving pin 128 while the latter selects and finally enters into driving relation with one of the sockets 130, and also making it possible to delay the camming of the plunger 134 out of its groove 132 substantially until the same would, in the normal descent of the spindle 74, ride out of the groove 132. The converse holds true when the transfer table 78 is, as hereinafter described, raised from its lowermost position (Fig. 9) while the turntable 60 still spins, i. e., the plunger 134 will enter the groove 132 in the spindle 74 and assume the guidance of the latter when the pin 128 on the spinning turntable is sufficiently retracted from driving relation with its present socket 130 to be harmlessly cammed out of the way by the chamfered end 144 of the latter. It is thus apparent from the foregoing that the records are positively interlocked with some part of the apparatus from the moment they are placed in the magazine until they are raised from the spinning turntable and ready for their ejection from the apparatus.

*Recording head "D"*

Referring to Figs. 2, 4 and 5, the recording or cutting head 150, which is of a conventional type and carries the cutting stylus 152, is carried by a long arm 154 which is pivoted on a rearward extension 156 of a mounting 158 that is carried by the upper end of a hollow spindle 160, journaled in a sleeve bearing 162 in the main support 20. Also pivoted to the rearward extension 156 of the mounting 158 is a lever 164 which is urged by a spring 166 into engagement with the arm 154 of the cutting head and acts as a counterweight on the latter whereby to regulate the pressure of the cutting stylus 152 on a record being operated on. More particularly, the arm 154 of the cutting head is channel-shaped (see also Fig. 20) and straddles the forked rearward extension 156 of the mounting 158. Threaded at 170 into the straddling flanges 168 of the arm 154 are needle bearings 172 which are received in conical seats 174 in other needle bearings 176 that are carried by the forked extension 156 of the mounting 158 and themselves received in conical seats 178 in the lever 164. One of the needle bearings 176 may be locked in place by a set screw (not shown) and the companion bearing 176 may freely slide axially in the forked extension 156, while the needle bearings 172 may be locked in adjusted position by nuts 180. Thus, the cutting head 150 may rock about its pivot mounting 172 and the spring-urged arm 164 may follow the rocking cutting head, without either of them encountering appreciable frictional resistance from their respective pivot mountings 172 and 176. As best shown in Fig. 5, the spring 166 is anchored with one end on a pin 182 on the mounting 158 and with its other end on a stud 184 which is threaded into the arm 164 so as to permit adjustment of the tension of the spring. A nut 186 may be applied to lock the stud 184 in adjusted position.

The instant cutting head 150 features an unusually long arm 154 of which the pivot mounting 172 is located considerably rearwardly of the vertical swinging axis of the cutting head as constituted by the hollow spindle 160, thus holding to a minimum any variation in the angle between the cutting stylus 152 and a record being operated on when the former passes over an uneven spot on the latter, and thereby mitigating any variations in the cut groove in the record due to an uneven spot or spots thereon. There is a further provision on the present cutting head by which the same will cut most uniform sound grooves on records even if their recording surfaces are uneven to the extent that they would ordinarily not give satisfactory recordings. This further provision lies in the attachment of the cutting stylus 152 to the head 150 so that the stylus forms a short tangent on a circle about the pivot mounting 172 of the cutting head as a center. In thus associating the cutting stylus 152 with the pivot mounting 172 of the cutting head 150, the angle between the stylus and a record operated on varies imperceptibly when the former passes over an uneven spot or spots on the latter, wherefore the cut groove is most uniform throughout even if the record is uneven in places.

Suitably carried by the mounting 158 is a bracket 190 on which is mounted, through intermediation of clamps 192, a waste tube 194 (Figs. 2, 4 and 5) the inlet end 195 of which is in close proximity to the cutting head 150, and the outlet end of which communicates through a suitable hose connection 196 with a vacuum pump (not shown). Due to its described mounting, the waste tube 194 swings with the cutting head 150 inwardly and outwardly of the turntable 60, and the tube 194 is adapted to attract by suction the chip removed by the cutting stylus 152 from a record being operated on and carry it to a suitable collector from which the accumulated chips may be removed from time to time. The coating preferred on records for the present apparatus may be any one of several well-known plastic compounds from which the cutting stylus cuts a chip that is an unbroken thread which travels through the tube 194 and hose connection 196 to the collector.

Record reproducing head "E"

The reproduction head 200, which may be of a conventional type, is conventionally mounted for pivotal motion at 202 about a horizontal axis (Fig. 1), and for swinging motion about a vertical axis inwardly and outwardly of the turntable in a bearing sleeve 204 in the main support 20. Suitably interposed between the arm 206 of the reproduction head 200 and a mounting member 208 for there is a spring 210 which acts as a counterweight on the head 200 whereby to regulate the pressure of the stylus 212 on a record being played.

Operating controls "F" for head "D" and "E"

The cutting and reproducing heads 150 and 200 are, except in one instance in the performance of the reproducing head 200, operated and controlled by cams 216, 218 and 220 (Figs. 4, 5 and 9) which are mounted as a unit on a sleeve 222 that is journalled on the bearing sleeve 66. Also suitably mounted on the sleeve 222 is a disk gear 224 which forms part of the drive for the cam assembly 226. Interposed between the cams 216, 218, 220 and the disk gear 224 are spacers 228, and the parts 216, 218, 220, 224 and 228 are held as a unit against an annular shoulder 230 on the sleeve 222 by a nut 232 on the latter. The sleeve 222 itself is held against axial movement on the fixed bearing sleeve 66 by a nut 234 on the latter.

As best shown in Fig. 5, the cutting head-carrying spindle 160 carries beneath the main plate 20 a bracket arm 236, having a follower 238 which is held in permanent engagement with the periphery of the cam disk 220 by a spring 240. While the follower 238 rides on the outer concentric periphery 220a of the cam disc 220 (Fig. 4), the cutting head 150 is in its outermost or inoperative position in which it is outside the confines of a record on the turntable. When the follower 238, in the course of clockwise rotation of the cam disc 220 as viewed in Fig. 4, next follows the abrupt drop 220b in the cam disc, the cutting head 150 is rapidly swung inwardly over a record on the turntable into position ready for lowering onto the record to start a recording. The follower 238 thereafter rides on the gradually inwardly progressing portion 220c of the cam disc 220, during which time the cutting head is moved slowly and uniformly inwardly of the record operated on for cutting the sound groove therein. The follower 238 finally rides on the outwardly progressing portion 220d after the recording is finished, whereby the cutting head is swung outwardly into its idle position (Fig. 4).

The cam disc 216 operates and controls the reproduction head 200 on its inward swing from idle position (Fig. 4) into position over a record for playing the same, and also on its outward swing into idle position after playing a record. To this end, there is pivotally mounted at 242 beneath the main support 20 a lever 244 (Fig. 4), having a follower 246 which cooperates with the cam disk 216, and a pin 248 which is adapted to engage an arm 250 that swings with the reproduction head 200 about the vertical axis x. Also pivoted at 242, but turnable independently of the lever 244, is an arm 252 which is normally urged by a spring 254 clockwise as viewed in Fig. 4, so as to force the arm 250 against the pin 248 on the lever 244. When the reproduction head 200 is in idle position (Fig. 4), the follower 246 engages a long dwell 256 in the cam disc 216. When, on clockwise rotation of the cam disc 216 as viewed in Fig. 4, the follower 246 rides down the incline 260 on said cam disc, the reproduction head 200 is permitted to be swung by the spring-urged arm 252 inwardly over a record on the turntable into position ready for lowering onto the record for playing the same. While the follower 246 rides on the short dwell 262 in the cam disc, the reproduction head 200 is lowered onto the record as hereinafter described, whereupon it will start playing the same approximately when the innermost dwell 264 in the cam disc 216 moves into operative alignment with the follower 246. On the described initial inward swing of the reproduction head 200 under the control of the incline 260 on the cam disc 216, the spring-urged arm 252 approaches and finally engages a stop 266 on the main support 20 so that the arm 252 no longer exerts a clockwise drag, as viewed in Fig. 4, on the reproduction head 200 when the follower 246 is confronted with the innermost dwell 264 in the cam disc 216. The stop 266 is preferably an eccentric which is angularly adjustable on a mounting stud 267 for fine adjustment. Thus, when the follower 246 is confronted with the innermost dwell 264 in the cam disc 216, the reproduction head 200 is no longer spring-urged inwardly of the record but is free to follow the sound groove in the record until the same is completely reproduced, whereupon the reproduction head 200 is raised from the record in a manner hereinafter described. During the reproduction period, i. e., while the reproduction head 200 is swung inwardly of the record by the sound groove therein, the follower 246 is dragged by the reproduction head closer and closer toward the innermost dwell 264 in the cam disc 216, but will not engage the same, so that the inward swing of the reproduction head during the playing of a record is entirely under the control of the sound groove in the latter. Immediately after the reproduction head 200 is raised from the record at the end of the reproduction period, the follower 246 is engaged by an abrupt shoulder 270 on the cam disc 216, with the result that the reproduction head 200 is quickly swung to the idle position shown in Fig. 4. Should the reproduction head 200 on its quick outward swing overtravel its idle position, it will immediately be returned to idle position by the spring-urged arm 252, as will be readily understood.

The cutting head 150 is lowered onto, and raised from, a record on the turntable 60 by means of a lift rod 272 (Fig. 5) which is axially slidable in the hollow spindle 160. More particularly, the lower end of the lift rod 272 rests on an arm 274 which is carried by a spring-urged plunger 276 that is axially slidable in a bushing 278 in the main support 20 (Fig. 5), while the web 279 of the channel-shaped arm 154 of the cutting head rests on the upper end of the lift rod 272. It appears from Fig. 5 that the lift rod 272 engages the arm 154 some distance away from the pivot mounting 172 thereof, wherefore axial movement of the lift bar 272 in opposite directions results in lowering and raising of the cutting head 150 to and from the turntable 60. Adapted to cooperate with the plunger 276 is the cam disc 218 (Fig. 4) which has an active peripheral portion 282. When the plunger 276 rides on the cam portion 282 as shown in Fig. 5, the plunger, together with the arm 274 and the lift rod 272, is raised sufficiently to hold the cutting head 150 in the raised or inoperative position shown in Fig. 5. The plunger 276 rides on clockwise rotation of the cam disc 218 as viewed in Fig. 4, onto the cam portion 282 over a circumferentially beveled leading end 284 thereof, and leaves the cam portion 282 over a circumferentially beveled trailing end 286 thereof. When the plunger 276 is off the cam portion 282, the same is depressed with its arm 274 into engagement with the head 290 of a stop pin 292 which is so adjusted as to prevent lowering of the plunger 276 below a position in which the same would fail to cooperate, as described, with the leading beveled end 284 of the cam portion 282. Of course, when the plunger 276 leaves the cam portion 282 at the beveled end 286 thereof and is spring-returned to its lowermost position as determined by the stop pin 292, the cutting head 150 is free to descend by gravity onto a record on the turntable 60, as will be readily understood. Since the waste tube 194 is carried on the mounting 158 as described, the same does not participate in the rising and lowering motions of the cutting head 150, but its inlet end 195 is so located that it is always in chip-receiving relation with the cutting stylus 152 when the same is performing on a record on the turntable.

Axially slidable in a bushing 300 in the main support 20 is another spring-depressed plunger 302 (Fig. 4) which carries a laterally projecting arm 304 beneath the main support 20. Resting on the arm 304 is the lower end of another lift rod 306 which is vertically slidable in the swing mounting 308 of the reproduction head 200, and on the upper end of which rests the threaded shank 310 of a set screw 312 in the pivoted arm 206 of the reproduction head 200 (Fig. 1). Thus, on axially moving the lift rod 306 in opposite directions, the reproduction head 200 is lowered onto, and raised from, a record on the turntable 60, as will be readily understood. Fine adjustment of the descent of the reproduction head 200 onto the turntable is accomplished by turning the set screw 312. Like the plunger 276 in Fig. 5, the plunger 302 is guided onto the active portion 282 of the cam disc 218 by the leading beveled end 284 thereof. When the plunger 302 rides on the cam portion 282, the reproduction head 200 is in its raised or inoperative position (Fig. 1). The reproduction head 200 is in playing position on a record on the turntable when the plunger 302 is off the cam portion 282 and in its lowermost or depressed position. As in the case of the arm 274 on the plunger 276 in Fig. 5, the arm 304 on the plunger 302 (Fig. 4) cooperates with a stop pin 314 so as to maintain the plunger 302, when off the cam portion 282, in operative alignment with the leading beveled end 284 of the latter.

*Operating controls "G" for mechanism "C"*

The crank-carrying shaft 112 (Figs. 2, 4 and 5) which, on rotation, operates the previously-described provisions for releasing the lowermost record from the magazine, is driven by a pin drive 320. As shown in Figs. 5, 6 and 7, the pin drive 320 comprises a driven element 322 and a driving element 324, of which the driven element is carried by the lower end of shaft 112 and provided with four equi-angularly spaced, depending pins 326. The driving element 324 comprises a sector plate 328 (see also Fig. 11) from which project two driving pins 330 that are adapted to cooperate with the pins 326 on the driven elements 322 in indexing the latter through steps of approximately 90° each. The driving element 324 is suitably mounted on the hub 332 of a cam disc 334 (Fig. 7) which is, in turn, mounted on a rotary shaft 336 that is suitably journaled in a frame 338 suspended on the main support 20.

During an operating cycle of the apparatus, the driving element 324 of the pin drive 320 passes through one complete, though intermittently interrupted, revolution clockwise as viewed in Fig. 11, during which the driving element 324 indexes the driven element 322 for a single record-release performance of the fingers 34 in the magazine. In the idle or home position of the apparatus, the leading driving pin 330' on the driving element 324 is approximately in driving relation with the pin 326' on the driven element 322 (Fig. 6), so that the driving pin 330' will, on rotation of the driving element 324 from home position, immediately index the driven element 322 through approximately 90°, bringing thereby the pin 326' on the driven element 322 into the position indicated at 326'' in Fig. 6. The crank 110 (Fig. 4) has now been advanced approximately 90°, and the cams 84, which prior to the described advance of the crank 110 were in the one end position shown in Fig. 16, have accordingly been turned clockwise as viewed in Fig. 12 beyond the position shown in Fig. 15 relative to their associated fingers 34, which then are in the below-described position to release the record R'' from the magazine, assuming thereby that the record R'' is presently the lowermost record in the magazine due to the present clockwise rotation of the cams 84 as viewed in Figs. 12 and 14 to 16. The fingers 34 are then so positioned that the fingers 34b, engaging the innermost dwells 108 in the cams 84 are completely retracted, and the fingers 34a, engaging the dwells 104a in the cams 84, partly extend into the adjacent notches 86 in the record R''. Due to the oscillation of the cams 84 by the crank 110, as described, the intermittent stop position of the cams 84 during their oscillation in opposite directions varies with each direction, as will be readily understood.

After the leading driving pin 330' leaves the driven pin 326' of the driven element 322 at the position 326'' in Fig. 6, the trailing driving pin 330'' has reached pin 326''' which in the meantime has been advanced to the position 326', and will during continued rotation of the driving element 324 advance the same to the position indicated at 326'' (Fig. 6), thus indexing the crank 110 another step, at the end of which the same has altogether been advanced through 180°. During the second described indexing step of the crank, the cams 84 are turned from the above-described intermediate stop position clockwise into the position shown in Fig. 14. During the latter rotation of the cams 84 their associated fingers 34 are actuated to perform their previously-described record-separating function. After the trailing driving pin 330'' clears the driven pin 326''' in the position 326'' in Fig. 6, the driving element 324 comes to an intermittent stop and thereafter completes its single revolution in the present operating cycle of the apparatus without further indexing the driven element 322, and comes to a final stop in the present operating cycle when its leading driving pin 330' moves again into substantial driving relation with the nearest pin 326 on the driven element 322.

Pivotally mounted at 342 on the frame 338 is a locking member 344 (Fig. 5) which, when resting on the driven element 322, projects between the upper ends of the nearest pins 326 in the manner shown in Fig. 6 and thus locks the driven element 322 against rotation in either direction. The locking member 344 carries a depending finger 346 which rides, during the indexing performance of the driving pins 330, on the outer periphery of the sector plate 328 so as to hold the locking member 344 in an upwardly-turned position in which the same clears the pins 326. The finger 346 on the locking member 344 is guided onto the periphery of the sector plate 328 by a leading beveled portion 348 thereof.

During a subsequent interrupted revolution of the driving element 324 of the pin drive 320 in the next operating cycle of the apparatus, the driven element 322 is indexed two further steps of approximately 90° each, during which the cams 84 are then turned counterclockwise as viewed in Fig. 12 from the position shown in Fig. 14 to that shown in Fig. 16 for the release from the magazine of the next lowermost record therein, such record assuming the same disposition in the magazine as the record R' in Fig. 14.

Pivoted at 350 on the frame 338 is a lever 352 (Fig. 5) one end of which is engaged by a follower 354 on the lower end of the axially movable spindle 74 which carries the transfer table 78. The other end of the lever 352 carries a stud 356 which is in engagement with a follower 358 that is vertically slidable in the frame 338 and rides on the periphery of the previously mentioned cam 334. The follower 358 is cylindrical and provided with a longitudinal slot 360 into which projects a pin 362 from the frame 338 so as to prevent rotation of the follower. The cam 334 is adapted, during one revolution thereof in each operating cycle of the apparatus and through intermediation of the follower 358 and lever 352, to raise and lower the transfer table 78 into the previously-described positions.

At the start of its single interrupted revolution in an operating cycle of the apparatus, the point p on the cam disc 334 (Fig. 11) is engaged by the follower 358, at which time the transfer table 78 is in its uppermost position. During approximately the first 45° of clockwise rotation of the cam 334 as viewed in Fig. 11 from home position, i. e. while the leading driving pin 330' on the driving element 324 causes the first described indexing step of the crank 110, the follower 358 rides on the concentric peripheral portion 362 of the cam disc 334, during which time the transfer table remains in its uppermost position and solely supports all the records in the magazine (Fig. 5). Thereafter, the follower 358 rides down the slight incline 364 on the cam disc 334, resulting in the previously described lowering of the transfer table 78 from its uppermost position into the position shown in Fig. 17 for the initial separation of the released record on the transfer table from the remaining records in the magazine. The follower 358 next rides down the steep incline 366 on the cam disc 334, resulting in the descent of the turntable to its lowermost position and according transfer of the record thereon onto the turntable 60. The cam disc 334 then comes to rest in the intermittent stop position shown in Fig. 11, and the cutting head 150 and the reproduction head 200 perform their respective functions during the intermittent stop period of the cam disc 334. Rotation of the cam disc 334 is thereupon resumed and the follower 358 will ride on a rise 368 in the cam disc, causing thereby the transfer table 78 and record thereon to rise from the turntable 60 part-way to its uppermost position. The follower 358 next rides down the steep but brief drop 370 in the cam disc 334, resulting in an according descent of the transfer table 78 for the ejection of the record thereon from the apparatus in a manner hereinafter described. The follower 358 then rides on the comparatively steep rise 372 in the cam disc 334, during which time the transfer table 78 is raised comparatively rapidly to a position near its uppermost position in which the same engages the centrally downwardly bulging portion of the lowermost record in the magazine. The follower 358 thereafter rides on the very gradual rise 374 in the cam disc 334 so that the transfer table 78 will be very gradually raised to its uppermost position and equally gradually assume the load constituted by the weight of the overlying records in the magazine and also by the weight W on top of these records. The transfer table thereby lifts the stacked records from the presently advanced fingers 34 and acts as the sole support of the records. Since the table 78 supports the records centrally thereof (Fig. 5), the latter will also be compelled to recover their original flat shape. The cam disc 334 finally comes to a stop at the end of its interrupted single revolution and at the end of an operating cycle of the apparatus, with the point p thereof in engagement with the follower 358, as explained.

*Turntable drive "H"*

Referring to Figs. 5 and 6, there is shown an electric motor 380 which is mounted in any suitable manner in the apparatus, and the shaft 382 of which is connected through a coupling 384 with a shaft 386 which is journaled in a casing 388. Provided on the shaft 386 within the casing 388 is a worm 390 which is in permanent mesh with a worm gear 392, mounted on the lower end of a vertical stub shaft 394. The stub shaft 394 passes upwardly through the casing 388 which is suitably carried by the mounting plate 138. Keyed or otherwise secured to the upper end of the stub shaft 394 is a helical gear 396 which, through an idler 398 (Fig. 6), is in permanent driving connection with the gear 70 on the hollow shaft 64 that carries the turntable 60. While in the present instance the gears 396 and 70 have a ratio of 1 to 1, the worm 390 and worm gear 392 constitute a gear reduction by reason of which the turntable 60 turns at considerably lower speed than the motor 380.

*Drive "I" for controls "F"*

Rotating with the gear 396 is a bevel gear 400 (Figs. 5 and 6) which is in permanent mesh with another bevel gear 402 on a shaft 404 which is journaled in a bracket 406 on the mounting plate 138. Shaft 404 is provided with a worm 408 which is in permanent mesh with a worm gear 410 (Fig. 6) on a vertical shaft 412 that is journaled in the bracket 406. The axial thrust in the shaft 412 from the worm gear 410 is directed downwardly and is taken up by a pin bearing 414 (Fig. 5). Pinned or otherwise secured to the upper end of the shaft 412 is a pinion 416 which is in permanent mesh with the gear disc 224 of the cam assembly 226 (see also Fig. 9). Thus, the drive of the cam assembly 226 has, besides the gear reduction in the worm 390 and worm gear 392, further gear reductions in the worm 408 and worm gear 410, as well as in the gears 416 and 224, with the result that the cam assembly 226 turns very slowly, and turns in fact through one complete revolution during an entire operating cycle of the apparatus.

*Drive "K" for controls "G"*

Referring to Figs. 5 and 6, there is coupled at 420 to the shaft 404 a stub shaft 422 which is journaled in a bushing 424 in the frame 338. Mounted on the stub shaft 422 is a gear 426 which is in permanent mesh with a gear 428, suitably journaled on a stub 430 which is mounted at 432 in the frame 338. Rotatable coaxially with the gear 428 is a pinion 434 which is in permanent mesh with a gear disc 436 (see also Fig. 8). The gear disc 436 is freely rotatable on a bushing 438 on the previously described shaft 336 (Fig. 7).

The gear disc 436 is adapted to drive the shaft 336 which carries the lift cam 334 for the transfer table 78, together with the driving element 324 of the pin drive 320. Since the lift cam 334 performs its designated function during both parts of a single interrupted revolution thereof in an operating cycle of the apparatus, as previously described, the gear disc 436 is at appropriate times in an operating cycle of the apparatus disconnected from, and reconnected with, the shaft 336 by means of a clutch 440 (Figs. 7 and 8). The driving section of the clutch 440 is constituted by a plurality of concentrically arranged holes or sockets 442 in the gear disc 436, while the driven clutch section is formed by the forwardly projecting head 444 on a plunger 446 which is axially slidable to and from the adjacent face of the gear disc 436 in an arm 448 that is pinned at 450 to the shaft 336. Plunger 446 is preferably splined at 452 in the arm 448 so as to be held against rotation therein. Plunger 446 is normally urged by a compression spring 454 against the gear disc 436, the spring 454 being interposed between the plunger and a spring retainer 456 which is screwed or otherwise secured to the arm 448. If unrestrained, the plunger 446 will, during rotation of the disc gear 436 while the machine is in operation, be spring-urged against the gear disc 436 and its head 444 will snap into registry with the next-aligning socket 442 therein and establish driving connection between the gear disc 436 and the shaft 336 through intermediation of the arm 448 on the latter.

Clutch 440 is closed when the apparatus is idle and while the same passes through an initial part of an operating cycle thereof, i. e., until the lift cam 334 arrives in the intermittent stop position shown in Fig. 11, at which time the lowermost record in the magazine has been released and transferred onto the turntable ready for the recording and reproducing actions of the cutting head 150 and reproducing head 200. Cam 334 is stopped in this intermittent position (Fig. 11) by a clutch disconnector 460 which a pin 462 on the plunger 446 approaches and engages at that time in an operating cycle of the apparatus. More particularly, the clutch disconnector 460 assumes the form of a wedge-like cam surface 464 on a slide 466 which is movable on a machined lug 468 on the frame 338. The slide 466 is provided with an oblong slot 470 through which extend holding screws 472 that guide the slide for linear movement radially of the axis of shaft 336. Slide 466 is normally urged by a spring 474 into the lowermost position shown in Figs. 7 and 8 in which the cam surface 464 thereof is in the path of movement of the pin 462 on the plunger 446. With the slide 466 in the lowermost position, the pin 462 on the plunger 446 will, when approaching the cam surface 464 on the slide 466 in the direction of the arrow 476 in Fig. 8, engage and ride up said cam surface 464, whereby the head 444 of the plunger is retracted from driving engagement with its respective socket 442 in the driving gear disc 436, and the arm 448 will come to rest approximately in the position shown in Fig. 8, while the pin 462 on the plunger 446 is still in engagement with the cam surface 464 on the slide 466.

Secured at 480 to the arm 448 is an angle bracket 482 on which is mounted a weight 484 that adds its inertia to that of the arm 448 to compel the latter to turn under its own momentum at approximately the same speed as the gear disc 436 when the head 444 of the plunger 446 is being retracted from its respective socket 442, thus reducing wear to the sockets 442 and to the plunger head 444 to a minimum. Slide 466 is provided with a stop pin 488 which will, on the described disengagement of the clutch 440, prevent overtravel of the pin 462 beyond the cam surface 464 on the slide 466 and, hence, premature re-engagement of the clutch.

Outwardly projecting from the cam disc 220 is a wedge-shaped cam lug 490 which, on clockwise rotation of the cam disc 220 as viewed in Fig. 4 and toward the end of an operating cycle of the apparatus, engages a roller 492 on the slide 466 (Figs. 7 and 8) and thereby raises the latter temporarily sufficiently to withdraw the cam surface 464 thereon from the pin 462 on the plunger 446, whereupon the latter is immediately spring-urged against the cam disc 436 and into driving engagement with the next approaching socket 442 therein. This takes place at the end of a reproduction period in an operating cycle of the apparatus when the finished record is to be ejected and the apparatus conditioned for the next operating cycle. Hence, the cam disc 334 then resumes its rotation from the intermittent stop position shown in Fig. 11 until the end of the present operating cycle of the apparatus, at which time the cam disc 334 has also completed the remaining part of its interrupted revolution and comes to rest with the point *p* adjacent the follower 358.

Record-ejecting device "L"

Journaled in bearing brackets 500 on the mounting plate 138 is a transverse shaft 502 (Figs. 5 and 6) on the opposite ends of which are mounted rockers 504, having secured thereto at 506 L-shaped arms 508 which straddle and extend above the main support 20 and carry hands 510. Carried by the shaft 502 is another arm 512 which is connected through a lengthwise adjustable link 514 with an arm 516 on a shaft 518 that is journaled in a boss 520 on the frame 338. Also mounted on the shaft 518 is a rocker 522 which is adapted to cooperate with a cam 524 on the shaft 336 in tilting the arms 508 with their hands 510 from the full-line position shown in Fig. 5 into the dot-and-dash line position there indicated for the hereinafter described removal of a finished record from the transfer table 78 and its ejection into a chute 526 (Fig. 5) which leads to the outside of the cabinet 12 for delivery of the record to the person that made the recording. The main support 20 is to that end recessed at 528 to permit the passage of a finished record into the chute 526.

The arm 512 on the shaft 502 carries a weight 530 (Figs. 5 and 6) which normally urges the arms 508 into the full-line position shown in Fig. 5 in which the hands 510 clear a record on the turntable 60 and either or both arms 508 may engage a stop or stops 532 of felt or the like.

The action of the arms 508 and their hands 510 in the ejection of a record from the apparatus is as follows: While the cam rise 368 (Fig. 11) causes, during the second part of the interrupted revolution of the cam 334 in an operating cycle of the apparatus, the transfer table 78 and record thereon to be raised to the dot-and-dash line position shown in Fig. 19, the cam 524 on the shaft 336 engages and turns the rocker 522 clockwise as viewed in Fig. 5, thereby causing rocking of the arms 508 into vertical disposition in which their hands 510 are beneath diametrically opposite peripheral portions of the record on the transfer table as shown in Fig. 19. The cam 524 is so designed that a brief dwell thereof causes the arms 508 to remain in their vertical disposition until the transfer table 78 is quickly lowered into the full-line position shown in Fig. 19 under the previously referred control of the steep drop 370 in the cam disc 334, whereby the table 78 transfers the record onto the hands 510 which are recessed at 536 for the reception of the record. The cam 524 (Fig. 5) thereupon causes continued swinging motion of the arms 508 forwardly into the dot-and-dash line position shown in Fig. 5, ejecting thereby the record on the hands 510 into the chute 526. As soon as cam 524 clears the rocker 522, the counterweight 530 returns the arms 508 with their hands 510 to the inoperative full-line position shown in Fig. 5.

Recording time indicator "M"

Suitably mounted on a pedestal 540 on the main support 20 is a dial plate or disc 542 (Figs. 4 and 5) which is visible from the outside of the cabinet 12 through a transparent window 544 in the door 18 thereof. The dial plate 542 bears markings indicative of the recording time allotted to a recording person during an operating cycle of the apparatus. Turnable on the dial plate 542 is a hand 546 which is carried by a shaft 548, suitably journaled in the pedestal 540 and carrying a bevel gear 550 which is in permanent mesh with another bevel gear 552 on a vertical shaft 554 which is likewise journaled in pedestal 540. The lower end of the shaft 554 carries beneath the main support 20 a sprocket 556 which is driven from a sprocket 558 on the sleeve 222 (Fig. 9) by a chain 560 that preferably runs also over a tensioning sprocket 562 on a pivot arm 564 (Fig. 4). The sprockets 556 and 558 are preferably of identical dimensions so that the hand 546 revolves, like the cam assembly 226, through one complete revolution during an operating cycle of the apparatus. This explains why the marked recording time on the dial plate 142 occupies less than 180° thereon.

Electrical operating devices and controls

The present apparatus is intended to be coin-operated. Let it be assumed, for example, that two different coins are required for an operation of the apparatus, such as a 25¢ piece and a 10¢ piece. To this end, there are provided in the cabinet 12 two chutes which are diagrammatically indicated at 570 and 572 in the wiring diagram in Fig. 24, and which are adapted to receive a 25¢ piece and a 10¢ piece, respectively, from a customer who wishes to make a recording. Normally extending into the "dime" chute 572 is a pivoted finger 574 which carries the blade 576 of a normally open switch 578. Switch blade 576 is connected with one side of a 110 volt A. C. power line 580 by way of leads 582 and 584, the contacts "2" of a connector 586, and leads 588 and 590. The fixed contact of switch 578 is connected with one fixed contact 592 of a double-pole switch 594 through leads 596 and 598. Interposed in the lead 598 is a holding relay 600. The pivoted blade 602 of switch 594 is normally spring-urged into engagement with the contact 592 thereof, and carries a finger 604 which normally extends into the "quarter" chute 570. The fingers 574 and 604 are normally in the path of descending coins in the respective chutes and are rocked out of the way by the passing coins which drop into a box in the cabinet 12. Blade 602 of switch 594 is connected with the other side of the power line 580 through leads 610 and 612, the engaged contacts "1" of the connector 586 and leads 614 and 616. Normally spring-urged into the "quarter" chute 570 above the finger 604 is a holding bar 618 which prevents the passage of an inserted 25¢ piece. The holding bar 618 is, on energization of the relay 600, retracted from the "quarter" chute 570 so as to permit the passage therethrough of a deposited 25¢ piece.

As hereinafter described, the circuit of the driving motor 380 of the apparatus is closed, and an operating cycle of the latter is started, when a deposited 25¢ piece rocks the finger 604 in its passage through the "quarter" chute 570. However, since an operation of the apparatus requires, in the present example, a 10¢ piece in addition to a 25¢ piece, the holding bar 618 is in the coin-holding position illustrated in Fig. 24 until a 10¢ piece is deposited in the "dime" chute 572 and rocks the finger 574 therein on its passage to the coin box. When finger 574 is thus rocked, switch 578 is closed whereby a starting circuit of the relay 600 is closed, which comprises leads 590 and 588, the engaged contacts "2" of the connector 586, leads 584 and 582, switch 578, lead 596, lead 598 with the interposed relay 600, contact 592 and blade 602 of switch 594, leads 610 and 612, the engaged contacts "1" of the connector 586, and the leads 614 and 616. This starting circuit is interrupted as soon as a deposited dime has passed the finger 574 in the chute 572, but the energized relay 600 has in the meantime closed a normally open holding switch 620 which is connected with the leads 598 and 584 through leads 622 and 624, respectively. Closure of the switch 620 by the relay 600 causes closure of a holding circuit of the latter, which comprises leads 590 and 588, the engaged contacts "2" of the connector 586, leads 584 and 624, switch 620, lead 622, lead 598 with the interposed relay 600, contact 592 and blade 602 of switch 594, leads 610 and 612, the engaged contacts "1" of the connector 586, and the leads 614 and 616. This holding circuit remains closed until a quarter piece in the chute 570 passes and rocks the finger 604, whereby the blade 602 of switch 594 is momentarily disengaged from the contact 592 thereof. Hence, the holding bar 618 will not permit an inserted quarter piece to actuate the finger 604 and thereby start an operation of the apparatus, until a dime is deposited in the chute 572. If a dime is deposited in the apparatus, no operation of the same will take place until an additional quarter piece is also deposited, as will be readily understood.

The circuit of the driving motor 380 of the apparatus includes a normally open switch 626 which is closed only on energization of an operation relay 628. A starting circuit of the relay 628 comprises leads 590, 630, 632 and 634, the relay 628 itself, a lead 636, the engaged contacts "4" of the connector 586 a lead 638, contact 606 and blade 602 of switch 594, leads 610 and 612, the engaged contacts "1" of the connector 586, and the leads 614 and 616. Hence, this starting circuit is momentarily closed when a dropping quarter piece in the chute 570 rocks the finger 602. Momentary energization of the operation relay 628 causes, however, closure through an actuator 642 of a normally open holding switch 640 in a holding circuit of the operation relay 628. The holding circuit of the operation relay 628 comprises the leads 590, 630, 632 and 634, the relay 628 itself, a lead 644, switch 640, a lead 646, the engaged contacts "2" of another connector 648, lead 650, a normally closed "stop" switch 652 on the frame 338 (see also Fig. 5), lead 654, the engaged contacts "1" of the connector 648, and the leads 656, 658, 660 and 616. Hence, the just-described holding circuit remains closed until the "stop" switch 652 is opened, in a manner hereinafter described, at the end of an operating cycle of the apparatus. The circuit of the driving motor 380 is closed when the "motor" switch 626 is closed. Switch 626 is, of course, closed by the energized operation relay 628 until the end of an operating cycle of the apparatus. The circuit of the driving motor 380 comprises the leads 590, 630, 632 and 662, the motor switch 626, leads 664 and 666, the motor itself, and the leads 668, 658, 660 and 616.

To speed up the action of the amplifier used in the apparatus, when needed during an operating cycle of the latter, the filaments of the amplifier tubes are always in circuit by way of leads 590, 630, 632 and 670, the filaments of the amplifier tubes, and leads 672, 674, 660 and 616.

Ganged with the holding and motor switches 640 and 626, respectively, is another normally open switch 676 which, when closed, closes the usual plate voltage winding on the usual power transformer by way of leads 678 and 680, the engaged contacts "4" and "1" of a connector 682, and leads 684 and 686.

As shown in Fig. 5, there is suitably mounted at 688 a normally open snap switch 690 which is closed by the arm 274 on the plunger 276 when the latter is permitted by the cam disc 218 to descend to its lowermost position in which the cutting head 150 is lowered onto a spinning record on the turntable 60. This switch 690, which is also shown in the wiring diagram in Fig. 24, is in the circuit of a "cutting period" relay 692. The latter circuit comprises leads 616, 660, 658, 694, the relay 692 itself, a lead 696, the engaged contacts "3" of the connector 648, a lead 698, switch 690, a lead 700, the engaged contacts "4" of the connector 648, a lead 702, leads 666 and 664, the motor switch 626, and leads 662, 632, 630 and 590. Hence, the "cutting period" relay 692 is, during an operating cycle of the apparatus, energized when the switch 690 is closed. Energization of the "cutting period" relay 692 causes, through intermediation of a pivoted actuator 706, simultaneous closure of a series of ganged, normally open switches 708, 710 and 712. Of these the switches 708, and 710 are single-throw switches, and the switch 712 is a single-pole double-throw switch.

Closure of the "vacuum motor" switch 708 by the action of the relay 692 as described, causes closure of the circuit of the previously mentioned vacuum motor, which comprises leads 590, 630, 632, 662, the "motor" switch 626, lead 664, switch 708, a lead 714, the suction motor itself, a lead 716, and leads 694, 658, 660 and 616. Switch 710, which is also closed by the action of the "cutting period" relay 692, closes the circuit through the pre-amplifier stage herein applied in the customary manner to amplify the impulses coming from the microphone (not shown), to the first amplifier tube in the audio-amplifier, with which the apparatus is equipped. As shown in the wiring diagram in Fig. 24, the switch 712 is normally in the one closed position shown when the "cutting period" relay 692 is not energized, i. e., at any time except during the period in each operating cycle in which the cutting head 150 performs its operation. In the position of the switch 712 as shown, the secondary winding of the audio-transformer is connected with the voice coil of the loud speaker 720 by way of leads 722, the engaged contacts "3" of the connector 682, a lead 724, switch 712, a lead 726, the voice coil of the loud speaker 720, lead 728, the engaged contacts "2" of the connector 682, and a lead 730. When the "cutting period" relay 692 is energized for the performance of the cutting head 150, as explained, switch 712 is in its other closed position in which the secondary winding of the audio-transformer is connected with the cutting head 150 by way of lead 730, the engaged contacts "2" of the connector 682, lead 728, the cutting head 150, a lead 732, switch 712, lead 724, the engaged contacts "3" of the connector 682, and lead 722.

There may further be provided a relay 800 (Fig. 24) which is engaged when the motor 380 is running, and which may actuate suitable mechanism (not shown) to prevent the deposition of coins into the chutes 570 and 572 during an operating cycle of the apparatus. There may also be carried by one of the guide bars 22' of the magazine (Fig. 13) a normally open snap switch 802 which is closed by a finger 804 on the weight W when the supply of records in the magazine is exhausted, or nearly so. Switch 802 will, when closed, actuate suitable mechanism (not shown) to lock the coin chutes 570 and 572, so that no further coins may be deposited therein until the magazine is refilled by an operator.

Mode of operation

When the apparatus is in its idle or home position (Figs. 4 and 5) the transfer table 78 is in its uppermost position, and the pin drive 320 is conditioned for almost immediate actuation of the described record-release provisions in the magazine when an operating cycle of the apparatus is started, the clutch 440 (Fig. 7) being to that end engaged when the apparatus is in idle position. The locking member 344 will, of course, be raised from its locking position (Fig. 5) by the beveled edge 348 of the sector plate 328 (Fig. 11) before the driven element 322 of the pin drive 320 is indexed by the driving element 324 thereof at the beginning of an operating cycle of the apparatus. On deposition into the chutes 570 and 572 of the coins required for an operation of the apparatus, the circuit of the driving motor 380 is closed in the described manner and an operating cycle of the apparatus is begun. As stated above, the pin drive 320 (Fig. 5) goes into immediate operation for two intermittent indexing steps of the crank 110 (Fig. 4), resulting in the described release by the fingers 34 of the presently lowermost record in the magazine (Figs. 12 to 16), and in the described separation of the released record from the remaining records in the magazine by the fingers 34 in conjunction with the described slight lowering of the transfer table 78 (Figs. 17 and 18). After the separation of the released record from the remaining records in the magazine, the follower 358 rides down the steep incline 366 on the cam disc 334 (Fig. 11), whereupon the latter comes to rest in the intermittent stop position shown in Fig. 11 due to the described disengagement of the clutch 440 at that time by the cam surface 464 on the slide 466 (Figs. 7 and 8). While the follower 358 rides down the incline 366 on the cam disc 334, the transfer table 78 with the released record thereon will descend to its lowermost position in which the record comes to rest on the turntable 60, ready to be operated on by the cutting head 150. When the cam disc 334 comes to its intermittent stop position (Fig. 11), the cam disc 220 (Fig. 4) has in the meantime advanced, clockwise as viewed in Fig. 4, from the home position there shown to a point where the follower 238 on the bracket arm 236 of the cutting head rides down the steep incline 220b in the cam disc 220, resulting in a quick inward swing of the cutting head 150 into position over the spinning record on the turntable ready to be lowered onto the latter for starting the recording. Substantially at this point in the operating cycle, the spring-urged plunger 276 rides down the beveled portion 286 of the cam disc 218 (Figs. 4 and 5), causing thereby lowering of the cutting head 150 onto the spinning record, and also the start of the actual recording due to the closure of the switch 690 by the arm 274 on the plunger 276, all as previously described. At this time, the turning hand 546 (Fig. 5) passes on the dial plate 542 the arrow marked "Start," indicating to the customer that he or she may now start to record by speaking or singing into the microphone. During the recording period, the cutting head 150 is guided inwardly of the spinning record by the portion 220c of the cam disc 220, and the chip removed during that time from the record by the cutting stylus 152 is drawn into and through the waste tube 194 to the collector by suction created by the previously mentioned vacuum motor which, as previously described, started to operate on closure of the switch 690 at the beginning of the recording period. While the cutting head 150 is still performing on the record, the reproduction head 200 is, under the control of the incline 260 on the cam disc 216, swung from its home or idle position (Fig. 4) inwardly substantially over the leading end of the cut sound groove in the spinning record, there to await the end of the recording. As soon as the recording is finished, of which fact the customer is advised when the hand 546 passes on the dial plate 542 the arrow marked "Stop," the reproduction head 200 is, under the control of the beveled portion 286 of the cam 218, lowered onto the record, whereupon the reproduction begins. The reproducing head 200 is during the reproduction period swung inwardly of the record by the cut sound grooves therein, as described. Substantially at the beginning of the reproduction period, the cutting head 150 is, under the control of the beveled portion 284 of the cam disc 218, raised from the record, and is then swung outwardly into its idle position under the control of the portion 220d of the cam disc 220, all as previously described. At the end of the reproduction, the reproducing head 200 is, under the control of the beveled portion 284 of the cam disc 218, raised from the record, and is then quickly swung outwardly into its idle position under the control of the abrupt shoulder 270 in the cam disc 216.

The cam lug 490 on the cam disc 220 (Fig. 4) performs substantially at the end of the reproduction period its designated, described function of causing re-engagement of the clutch 440 (Fig. 7) to cause continuation of the interrupted rotation of the cam disc 334 from the intermittent stop position shown in Fig. 11 to the end of its single revolution in the present operating cycle. When the cam 334 thus resumes its rotation, the transfer table 78 with the record thereon is raised, under the control of the rise 368 on the cam disc 334, to the dot-and-dash line position shown in Fig. 19. In the meantime, the cam 524 (Figs. 5 and 7) performs part of its designated function by rocking the arms 508 into vertical position in which the hands 510 thereon are directly beneath diametrically opposite portions of the record on the partially raised transfer table 78 (Fig. 19). The transfer table 78 is then quickly lowered into the full-line position shown in Fig. 19 under the control of the abrupt drop 370 in the cam disc 334 (Fig. 11), whereby the record is transferred onto the hands 510 in the manner shown in full lines in Fig. 19. The cam 524 (Fig. 5) then completes its performance by rocking the arms 508 to the dot-and-dash line position shown in Fig. 5, whereby the record is ejected into the chute 526 through which the same passes to the outside of the cabinet where it may be picked up by the customer as his or her property. The arms 508 with the hands 510 are, after the ejection of the record, urged by the weight 530 into the full-line home position shown in Fig. 5. After the intermittent drop of the turntable 78 from the dot-and-dash line position into the full-line position shown in Fig. 19 for the ejection of the record from the apparatus, the cam disc 334 will, during its remaining rotation to the end of its single revolution in the present operating cycle, cause the transfer table 78 to rise to its uppermost position, first rapidly and then very gradually for the reasons described earlier. Just before the cam disc 335 stops at the end of the present operating cycle of the apparatus, a pin 652a thereon momentarily open the stop switch 652, whereupon the apparatus comes to rest as previously explained.

Referring now to Fig. 25, there is shown a chart which graphically illustrates the timed relation of the operations of the various mechanisms and devices of the apparatus during a complete operating cycle of the latter, i. e., during one complete revolution of the cam assembly 226. Thus, the line a in tier I of the chart represents the time period in an operating cycle during which the lowermost record in the magazine is released and separated from the remaining records in the magazine.

The raising and lowering of the transfer table 78 is graphically illustrated in tier II. Thus, the transfer table is slightly lowered from its topmost position at the point b for the separation of the released record from the records in the magazine. The transfer table with the released record thereon is thereupon lowered at the point c for the transfer of the record onto the turntable. The transfer table is next partially raised near the end of the operating cycle between the points d and e, and is then slightly lowered to the point f for the explained ejection of the record from the apparatus. Finally, the transfer table is raised to its uppermost, record-supporting position.

The tier III graphically illustrates the inward and outward swing of the cutting head 150. Thus, the quick initial inward swing of the cutting head from its idle position into position for starting the recording is represented by the line g—h. The cutting head is thereupon gradually swung inwardly on the record for the recording, as represented by the line h—i. The return swing of the cutting head into its idle position is represented by the line i—j.

The raising and lowering of the cutting head from and onto a record on the turntable is graphically illustrated in tier IV. Thus, the cutting head is lowered onto the record at the point k, and is raised from the record at the end of the recording at the point l.

The inward and outward swing of the reproduction head 260 is graphically illustrated in tier V. Thus, the reproduction head is initially swung inwardly from its idle position into starting position over the record before the recording is finished, this initial swing of the reproduction head being represented by the line m—n. The reproduction head remains in this intermittent position until the recording is finished, i. e., to the point o. Thereupon the reproduction head is slowly swung inwardly of the record by the sound groove therein to the point q in the chart. The reproduction head is thereupon swung outwardly to its idle position between the points q and r.

The raising and lowering of the reproduction head is graphically illustrated in tier VI. Thus the reproduction head is lowered onto the record on the turntable at the point s, and is raised from the record at the point t.

The record-ejecting performance of the arms 508 is graphically illustrated in tier VII. Thus, the swing of the arms 508 from the full-line position shown in Fig. 5 into the vertical position shown in Fig. 19, for the reception of the record from the transfer table, is represented by the line u—v, while the line v—w represents the continued forward swing of the arms 508 from vertical position into the dot-and-dash line position shown in Fig. 5 for the ejection of the record from the apparatus.

It will be understood that various changes in the details of construction and in the arrangement of parts may be made without departing from the underlying idea or principles of the invention within the scope of the appended claims.

Having thus described my invention, what I claim and desire to secure by Letters Patent, is:

1. In phonographic apparatus, a magazine for a vertical stack of record discs having different spaced cut-out portions, means at the lower end of said magazine engaging and supporting the lowermost disk therein at the peripheral margin thereof and being operable to release said lowermost disc for discharge from the magazine, a turntable beneath said magazine, said turntable comprising complementary sections of which one section has spaced driving elements and is raisable into engagement with a portion inside said peripheral margin of the lowermost disc in the stack to such an extent as to assume the sole support of all stacked discs, and is lowerable to transfer a released disc onto said turntable, means arresting said one section in a predetermined angular position when being raised from the other section, and means registering with cut-out portions of the stacked discs to guide the latter onto the raised section in an angular position in which other cut-out portions thereof register with said driving elements.

2. In phonographic apparatus, a magazine holding a vertical stack of superposed record discs, said magazine having means operable to release the lowermost disc for discharge therefrom, a turntable positioned beneath said magazine, said turntable comprising complementary sections of which one section is driven and the other section is movable relative to said one section to and from the lowermost disc in the magazine to transfer the same, when released, onto the turntable, means drivingly connecting said sections only when in complementary relation with each other, and means including a longitudinally extending groove in said other section and a yielding plunger registerable therewith for arresting said other section against rotation when disconnected from complementary relation with said one section.

3. In phonographic apparatus, a turntable comprising complementary sections bearing different portions, respectively, of a record disc, a central section thereof being raisable with a disc thereon above the other section, and arms having disc-supporting ends and being pivoted underneath said other section for unitary swinging motion to both sides of a disc-receiving station in which they extend substantially vertically beneath substantially diametrically opposite peripheral portions, respectively, of a disc on the raised central section, and receive said disc on their supporting ends, when said raised section is lowered beneath said supporting ends, for swinging movement with the latter from said disc-receiving station for the ejection of said disc from the apparatus.

4. A magazine for identical phonographic record discs each having spaced, inwardly offset peripheral portions and a locating element unequally spaced from the adjacent offset portions comprising a container with an open discharge end for holding a stack of alternately inverted discs, fixed means in said container for aligning the locating elements of the stacked discs so that identical offset portions of successive discs are so staggered as to be covered on opposite sides by non-offset peripheral portions of the adjacent discs, disc-retaining fingers movable at the discharge end of said container and in a common plane perpendicular to the central axis of the disc stack from the outside of said container to and from alignment with the staggered offset portions, respectively, of the stacked discs, and means for moving said fingers in opposite directions so that they release the foremost disc for discharge from said container and retain the other discs therein.

5. A magazine for identical phonographic record discs each having several spaced notches in its circular periphery and a locating element unequally spaced from the adjacent notches, comprising an upright cylindrical guide with an open discharge end at the bottom for holding a vertical stack of alternately inverted discs with their locating elements vertically aligned, whereby identical notches of successive discs are so staggered as to be covered on opposite sides by non-notched peripheral portions of the adjacent discs, disc-supporting fingers movable at the discharge end of said guide and in a common plane perpendicular to the central axis of the disc stack from the outside of said container to and from alignment with the staggered notches, respectively, of the stacked discs, and means for moving said fingers in opposite directions so that they release the lowermost disc for discharge from said guide and support the other discs therein.

6. In phonographic apparatus, a magazine adapted to hold a supply of orderly arranged record disks each having first and second locating elements, a rotary turntable, a device for transferring the foremost disks in said magazine onto said turntable, first means in said magazine cooperating with said first elements of the disks therein for guiding the latter in a predetermined angular position only through said magazine, and means on said device cooperating with said second elements of said foremost disk for locking the latter to said device against rotation from said predetermined angular position during its transfer from said magazine onto said turntable.

7. In phonographic apparatus, a magazine adapted to hold a supply of orderly arranged record disks each having locating elements and lock elements, a rotary turntable, a disk-transfer table having driving members and being rotatable coaxially of said turntable and axially movable into first and second positions in which it is seated on said turntable and in supporting engagement with the foremost disk in said magazine, respectively, a driving connection between said tables operative only when said transfer table is in said first position, means arresting said transfer table in a predetermined angular position when not seated on said turntable, means in said magazine cooperating with said locating elements of the disks therein for guiding the latter through said magazine in a predetermined angular position only in which the lock elements of said foremost disk register with and become locked to the driving members of said transfer table when the latter is in said second position, and means for releasing said foremost disk from said magazine.

ALEXANDER LISSIANSKY.

References Cited in the file of this patent

UNITED STATES PATENTS

| Number | Name | Date |
|---|---|---|
| 1,844,410 | Schalk | Feb. 9, 1932 |
| 1,879,291 | Johnson et al. | Sept. 27, 1932 |
| 1,942,864 | La Rue | Jan. 9, 1934 |
| 2,017,898 | Gates | Oct. 22, 1935 |
| 2,214,913 | Vischer, Jr. | Sept. 17, 1940 |
| 2,230,106 | Erwood | Jan. 28, 1941 |
| 2,237,340 | Downs | Apr. 8, 1941 |
| 2,308,880 | Hokanson | Jan. 19, 1943 |
| 2,357,034 | Thompson et al. | Aug. 29, 1944 |
| 2,402,150 | Dale | June 18, 1946 |
| 2,434,033 | Cain | Jan. 6, 1948 |
| 2,437,557 | Rockola et al. | Mar. 9, 1948 |
| 2,526,513 | Somma | Oct. 17, 1950 |
| 2,559,786 | Mueller | July 10, 1951 |

FOREIGN PATENTS

| Number | Country | Date |
|---|---|---|
| 317,895 | Great Britain | Aug. 26, 1929 |
| 63,231 | Denmark | Mar. 5, 1945 |